United States Patent [19]
Sugimoto

[11] Patent Number: 5,403,480
[45] Date of Patent: Apr. 4, 1995

[54] POROUS FILTER FOR LIQUID PURIFICATION, AND LIQUID PURIFYING FILTER ASSEMBLY AND LIQUID PURIFICATION PLANT EMPLOYING THE SAME

[76] Inventor: Akitoshi Sugimoto, 244, Mama, Kochi-shi, Kochi, Japan

[21] Appl. No.: 931,403

[22] Filed: Aug. 24, 1992

[30] Foreign Application Priority Data

Aug. 29, 1991 [JP] Japan .................. 3-218698
Dec. 9, 1991 [JP] Japan .................. 3-324850

[51] Int. Cl.$^6$ ............................ B01D 39/14
[52] U.S. Cl. .................. 210/323.2; 210/346; 210/486; 210/494.1; 210/497.01; 210/497.3; 210/510.1; 55/523
[58] Field of Search ........... 210/232, 323.1, 323.2, 210/331, 346, 486, 510.1, 437, 439, 487, 494.1, 497.01, 497.2, 497.3; 55/523

[56] References Cited

U.S. PATENT DOCUMENTS

| 2,781,913 | 2/1957 | Thompson . | |
| 3,747,765 | 7/1973 | Nowak | 210/510.1 |
| 4,072,616 | 2/1978 | Röhlig | 210/494 |
| 4,645,596 | 2/1987 | Kuwajima | 210/346 |
| 4,695,301 | 9/1987 | Okajima et al. | 210/510.1 |
| 4,894,158 | 1/1990 | Morita et al. | 210/510.1 |
| 4,921,607 | 5/1990 | Langley | 210/510.1 |
| 5,088,554 | 2/1992 | Arterbury et al. | 210/510.1 |
| 5,098,571 | 3/1992 | Maebashi | 210/510.1 |

FOREIGN PATENT DOCUMENTS

| 0253620 | 1/1988 | European Pat. Off. . |
| 475445 | 5/1915 | France . |
| 9002547.4 | 8/1991 | Germany . |

Primary Examiner—Robert A. Dawson
Assistant Examiner—W. L. Walker
Attorney, Agent, or Firm—Young & Thompson

[57] ABSTRACT

A liquid purifying porous filter and a filter assembly employing the same can significantly improve filtering performance for impurities in the drinking water, liquors, liquidous seasoning or pool water and can perform back washing while purifying operation is maintained. The filter assembly is small in size, compact and easy to handle, and achieves high performance both in senses of quality and quantity, and is capable of performing back washing while maintaining operation, is compact and is easily installed. The porous filter for purifying a liquid comprises a hollow body having an outer peripheral surface contacting with a non-purified liquid before purification and an inner periphery defining a central through opening and contacting with the non-purified liquid or a purified liquid, and a wall portion of the hollow body defined between the outer peripheral surface and the inner peripheral surface, which is formed with a plurality of through holes for flowing a liquid after purification in the axial direction.

20 Claims, 20 Drawing Sheets

POROUS FILTER FOR LIQUID PURIFICATION, AND LIQUID PURIFYING FILTER ASSEMBLY AND LIQUID PURIFICATION PLANT EMPLOYING THE SAME

BACKGROUND OF THE INVENTION

1. Field of the Invention

The present invention relates generally to a liquid purifying porous filter, and a liquid purifying filter assembly and a liquid purification plant employing the same for removing organic and inorganic impurities, harmful contaminants, offensive odor substances and the like from a liquid containing those substances. More specifically, the invention relates to a high performance and a high capacity liquid purifying filter, and a liquid purification filter assembly and a liquid purification plant for obtaining a purified drinking water or a purified water from water contaminated with organic and/or inorganic substances or so forth, such as water of a water service, in the river, the sea, a pool, a drainage or so forth, and for obtaining a beer, a wine, a sake, a soy sauce, a sauce, a drink, a fruit juice, a cooking oil and so forth by filtering various solids and impurities.

2. Description of the Related Art

Conventionally, there have been proposed and used filtration plants employing porous ceramic filters as filtering members for filtering out various contaminants, bad smell (offensive odor) substances and impurity not suitable for drinking, in order to obtain a drinking water from water in the river, the sea or drainage. Also, in the recent years, water purification equipments have been available in the market, which improves bad smell and/or poor taste of a well water or a city water due to small content of organic and/or inorganic substances or so forth. Many of such water purification equipments also employs the porous ceramic filters.

Furthermore, for removal of solids and/or impurities from fermentation products in brewing of a beer, a wine, a sake, a soy sauce or the like, or for removal of solids and/or impurities to obtain a sauce, a drink, a fruit juice, a cooking oil and so forth from food materials, the porous ceramic filters are also used. Since the drinking water, liquors, fruit juices, drinks, cooking oils are served for drinking and eating, substantially high performance is required as the performance of the purification equipments. Also, in case of implementation in the industrial scale, large scaling of the purification plant becomes necessary.

On the other hand, due to recent increased sensitivity for environmental pollution, requirements for water quality for industrial waste is becoming more strict. This induces requirement for higher performance and larger scale of purification plants for water purification. In addition, it is a trend toward the future to apply restriction even for waste from various businesses, waste from school, various facilities and so forth, waste from families, living originated waste. Due to such prospect, high performance and low cost purification equipments in various types in a wide range of scales from small one to large one have been required.

In the meanwhile, associated with recent growth of interests for physical fitness, various people, irrespective of age and sex, enjoy swimming in the pool as a whole body exercise which promotes health and reduces stresses.

With the desire for further enjoying swimming in safer and more healthy environments, sensitivity for sanitary condition of the pool, particularly for water quality is growing. For this reason, demands for the purification plants which determine water quality of the pools become more severe. In response to such demands, progress has been made higher performance and larger scale in the purification plants.

Here, further discussion will be given with taking a pool water purification plant as a typical example. The pool water purification plant generally includes a pre-filtration unit for removing impurities, such as dirt, hairs and so forth, a filtration unit, an absorptive purification unit, a disinfecting unit for implementing disinfecting of the pool water, and so forth. In addition, a unit for supplying a filter aid for the filtration unit, a pool water heating unit in case of a warm water pool or so forth may be incorporated as required. Normally, the pool water is purified by circulation between this purification plant and the pool and thus maintained in sanitary condition.

In such circumstance, the porous ceramic filters are frequently employed as the filtration unit applied for the pool water purification plant. The porous ceramic filter has three-dimensionally arranged fine filtration void network suitable for trapping or filtration of the water in the pool, particularly in the warm water pool. The porous ceramic filter enables satisfactory filtration even for the organic substances, such as oils excreted from the human body, which cannot be filtered out by the conventional filters.

FIG. 24 generally shows the conventional pool water filtration unit employing such porous ceramic filter. In the conventional filtration unit, a cylindrical porous ceramic filter (hereafter referred to as "filter") 500 is closed by a lid 502 at the top and is fixedly disposed within a hollow cylindrical housing tank 504. Typically, in the pool water filtration unit, a plurality of filters 500 may be fixed within the tank depending upon an amount of pool water to be processed, a capacity of the tank and so forth. However, the exemplary example of the filtration unit as a typical example, illustrates an example employing one filter 500 within the tank 504.

An inlet line 508 for introducing water from a pool 506 is connected to the side wall of the tank 504 at the left side in the drawing. An outlet line 510 for recirculating the purified pool water to the pool 506 is connected to the center of the bottom of the tank. Also, a line 512 for introducing a filter aid is arranged in the side wall at the right side in the drawing. An air vent 514 is provided at the top surface of the tank. Furthermore, a drain line 516 is arranged outside of the filter 500 in the bottom of the tank. In addition, a back wash line 518 for washing the filter 500 is connected to the outlet line 510. By a circulation pump 520, the pool water is circulated from the pool 506 through the inlet line 508, the filtering tank 504 and the outlet line 510 in order and then recirculated into the pool. Namely, the pool water is pressurized to pass the filter 500 as indicated by the solid arrows so that the impurities can be removed by the filter 500, and the purified water is then recirculated into the pool 506.

In the meantime, the porous ceramic filters generally performs fine filtration and thus have high filtration performance. However, in the shown conventional cylindrical porous ceramic filter 500, the processing performance is limited. Therefore, in the filtration unit for the drinking water, liquors and so forth, or the pool water, a plurality of filters 500 are fixedly disposed within the filtration tank for obtaining necessary processing performance. As a result, the high performance filtration unit inherently becomes large.

In addition, the pool water purification plant includes a plurality of components, such as foregoing various types of pre-filter units depending upon the object, various disinfection units, absorptive filter units and so forth, in addition to the filtration unit. Piping for connecting these components becomes complicate to further increase the size of the overall construction of the purification plant.

Conversely, for efficient use of the pool, increasing of utility facilities and limitation of the construction area of the facility, the pool water purification plant is often required to be installed in a relatively narrow limited space. The same is true of the purification plants for drinking water, liquors, liquidous seasonings or so forth. For this reason, a liquid purification plant employing a high performance and compact porous ceramic filter has been desired.

SUMMARY OF THE INVENTION

It is an object of the present invention to provide a liquid purifying porous ceramic filter which can significantly improve filtering performance for impurities in the drinking water, liquors, liquidous seasoning or pool water and can perform back washing while purifying operation is maintained.

Another object of the present invention is to provide a liquid purifying filter assembly which is small in size, compact and easy to handle, and achieves high performance both in quality and quantity.

A further object of the invention is to provide a liquid purification plant, such as a pool water purification plant which can suitably satisfy performance required for high level and high performance liquid purification in removal of impurities, disinfection and so forth, which is applicable to a large size pool while maintaining the construction and size equivalent to a conventional plant, which is capable of performing back washing during operation, and which is compact and easily installed.

In order to accomplish the above-mentioned object, a liquid purifying porous filter, according to the first aspect of the present invention, comprises a hollow body having an outer peripheral surface contacting with a non-purified liquid before purification or a purified liquid after purification, and an inner periphery defining a central through opening and contacting with the non-purified liquid or the purified liquid, and a wall portion of the hollow body defined between the outer peripheral surface and the inner peripheral surface, which is formed with a plurality of through holes for flowing the purified liquid after purification or the non-purified liquid before purification in the axial direction. Here, it is preferred that at least one of the outer peripheral surface and the inner peripheral surface of the hollow body has an uneven configuration. Also, it is preferred that a plurality of the through holes extend obliquely toward the center of the hollow body relative to the axial direction. In the alternative, a plurality of the through holes extend in configurations bent toward the center of the hollow body relative to the axial direction. In either case, it is preferred that the inner peripheral surface and the outer peripheral surface of the hollow body defines a truncated conical body or a mortar like body contracting and/or expanding diameter corresponding to obliquity of the through holes. Further preferably, at least two through holes are arranged in alignment in the radial direction. Also, in the preferred construction, the liquid purifying porous filter is a porous ceramic filter.

On the other hand, in order to maintain the purification performance of the porous ceramic filter in a conventional plant, operation is stopped and the pure water is circulated together with the high pressure air in the reverse direction to remove the impurities adhering on the filter together with the coating agent. Therefore, a problem exists in that the purifying operation cannot be performed while the plant is maintained in inoperative condition. Also, the conventional plant requires operation to be stopped for a given interval.

According to the second aspect of the invention, a joined liquid purifying porous filter comprises a plurality of above-mentioned porous filters, and at least one joining member interposed between the porous filters and defining fluid flow paths respectively establishing fluid communication between the central through openings and the peripheral through holes of joined porous filters. Here, it is preferred that the joining member defines central openings defined at both axial ends and mating with the central through openings of the hollow body of the porous filter and closed at the other end, a communication hole for communicating the central opening to the outer peripheral surface of the hollow body, and a plurality of circumferentially arranged communication paths respectively located corresponding to a plurality of the through holes of the hollow body for communication therewith. Also, in the preferred construction, the porous filters are a truncated conical bodies, which are connected at the larger diameter ends and/or at the smaller diameter ends by means of the joining members so as to define axially meandering through holes.

On the other hand, according to the third aspect of the invention, a liquid purifying porous filter assembly comprises:

above-mentioned liquid purifying porous filter;
a jacket supporting one end of the filter, the jacket defining a central hole for flowing the non-purified liquid, formed corresponding to the central through opening of the hollow body of the filter and closed at the end remote from the hollow body, a plurality of communication holes establishing fluid communication between the central hole and the outer periphery thereof, a plurality of purified liquid flow path arranged circumferentially at positions outside of the central hole and a central discharge opening for discharging purified liquid with integrating a plurality of the purified liquid flow path;
a cover supporting the other end of the filter, the cover defining at least one opening provided corresponding to the central through opening of the hollow body of the filter and introducing non-purified liquid, a nozzle for washing the central through opening, and peripheral edge portion blocking a plurality of through holes of the hollow body of the filter; and
means for holding the filter between the jacket and the cover.

According to the fourth aspect of the invention, a liquid purifying filter assembly comprises:
a liquid purifying porous filter as defined in the claims;

a jacket supporting one end face of the filter, the jacket defining a discharge path corresponding to a plurality of the through holes of the filter for discharging a first stage purified liquid and a central discharge path for flowing a second stage purified liquid;

a cover supporting the other face of the filter in blocking fashion, the cover having nozzles provided at positions corresponding to a plurality of the through holes of the filter for washing respective through holes; and means for holding the filter between the jacket and the cover.

In the above-mentioned third and fourth aspects, the holding means preferably comprises a female thread portion provided at a blocking portion of the central hole of the jacket, a stud having male thread portions at both ends, a supporting portion provided at the center portion of the cover and defining an opening, through which the stud extends, and a nut threadingly engaged to the stud. Also, the supporting portion is formed with arm members radially extending from the circumferential portion of the cover.

According to the fifth aspect of the invention, a liquid purifying plant comprises a filtration means having at least one liquid purifying filter assembly of the second and third aspects of the invention, within a filtration tank, a back washing means for the filtration means, an absorptive purification means and a disinfection means. It is preferred that the liquid purifying plant further comprises an ultramicro filtration means.

According to the sixth aspect of the invention, a liquid purifying plant comprises at least one of an absorptive purification means, a disinfection means and an ultramicro filtration means within a hollow body of a liquid purifying porous filter of the first aspect.

BRIEF DESCRIPTION OF THE DRAWINGS

The present invention will become more fully understood from the detailed description given herebelow and from the accompanying drawings of the preferred embodiments of the present invention, which, however, should not be taken to be limitative to the invention, but are for explanation and understanding only, In the drawings.

DESCRIPTION OF THE PREFERRED EMBODIMENTS

A liquid purifying filter, and a liquid purifying filter assembly and a liquid purification plant employing the filter, according to the present invention, will be discussed hereafter in greater detail in terms of the preferred embodiments illustrated in the accompanying drawings. However, it should be appreciated that the following discussions should not be taken to be limitative to the invention.

Figure 1:
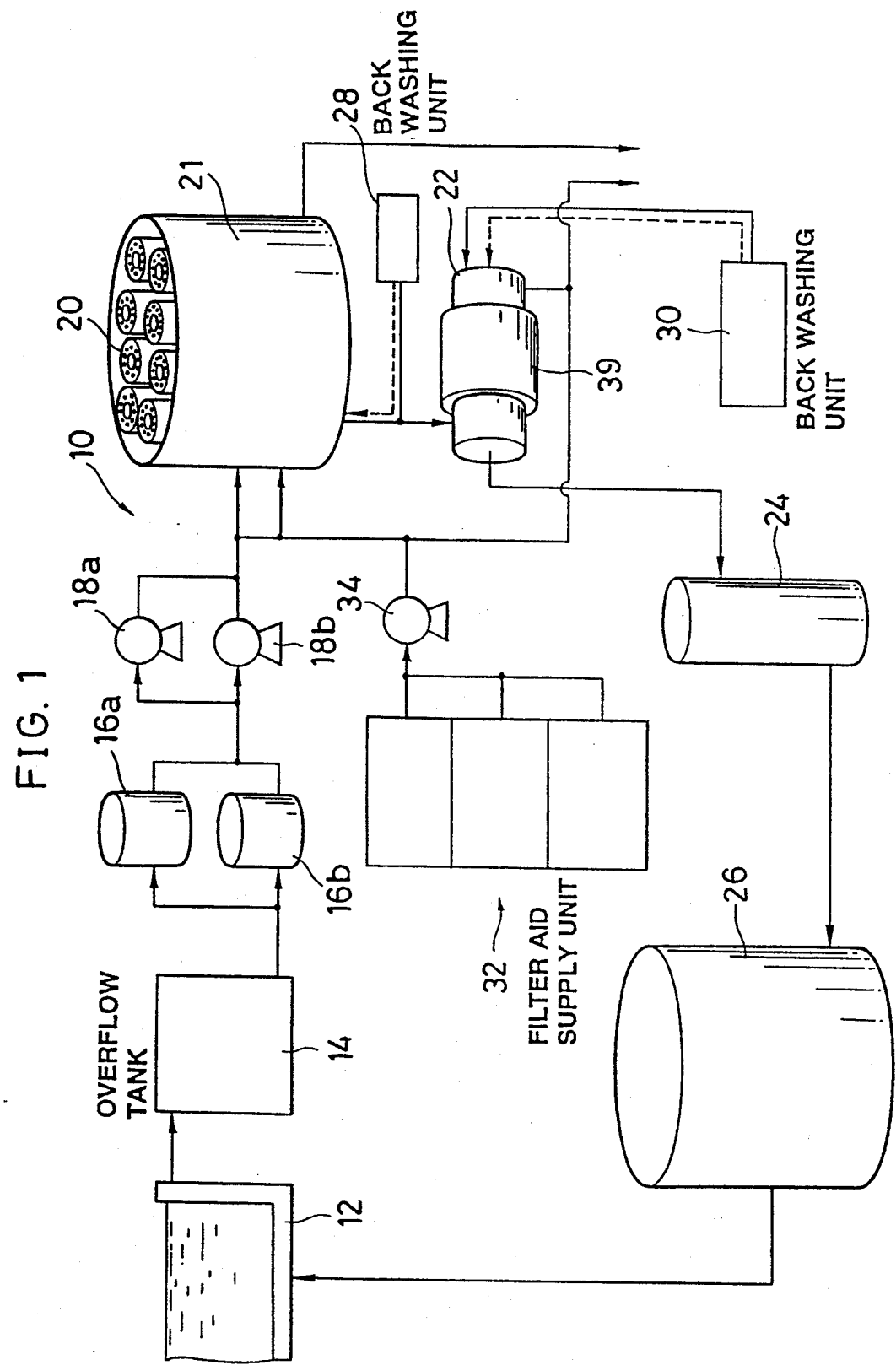
FIG. 1 is an exemplary diagrammatic illustration showing one example of a pool water purification plant as one example of implementation of a liquid purification plant according to the present invention.

FIG. 1 is a general illustration showing the basic construction of one embodiment of a pool water purification plant according to the foregoing fifth aspect of the present invention.

As shown, a pool water purification plant 10 according to the present invention, includes an overflow tank 14 for accumulating pool water over flown from a pool 12, pre-filters 16a and 16b, pool water circulating pumps 18a and 18b, a fine filtration unit 20 employing a plurality of porous ceramics filters 20a according to the first aspect of the present invention, an ultramicro filtration unit 22, a disinfection unit 24, an absorptive purification unit 26, a back washing unit 28 for the fine filtration unit 20, a back washing unit 30 for the ultramicro filtration unit 22, a filter aid supply unit 32, and a slurry pump 34. Here, it should be noted that FIG. 1 illustrates the basic construction of the pool water purification plant of the present invention. The pool water purification plant of the invention may, of course, incorporate various tanks, such as a chlorine tank, alkaline tank and other tanks, and equipments, such as valves, pipings, a heat exchanger and so forth, as normally employed, depending upon necessity therefor.

The overflow tank 14 is adapted to temporarily accumulate or store pool water overflown from the pool 14 or pool water in normal drain or forced drain by the pump. The overflow tank 44 feeds a given amount of pool water to the pre-filters 16a and 16b through a piping.

The pre-filters 16a and 16b comprises carbon filters or the like arranged within the tank and adapted to remove relatively large impurities, such as hair, waste thread, bandage or dirt contained or floating in the pool water, so that fine filtration by the porous ceramic filter 20 in the later stage can be performed smoothly. The number of pre-filters is not critical and can be one or three or more.

The pumps 18a and 18b are circulation pumps and can be any type of pumps which can provide sufficient energy for circulating the pool water through a flow path of the pool water purification plant 10 according to the invention. The number of circulation pumps is not critical but can be one or a plural arranged either in parallel or in series.

The disinfection unit 24 is adapted to perform disinfection, sterilization and deactivation of bacteria, such as colon bacillus, staphylococcus or the like, or virus contained in the pool water. The disinfection unit 24 is adapted to disinfect the filtrated pool water circulating outside of a transparent quartz glass tube with an ozone lamp and a ultraviolet lamp inserted within the quartz glass tube. Also, the disinfection unit 24 introduces dried air into the quartz glass tube to generate ozone by the ozone lamp and the ultraviolet lamp and to agitate the pool water by bubbling with the ozone containing air to mix the ozone containing air in the pool water in a form of fine bubbles for oxidation disinfection. As set out later, the pool water is normally subject to chlorine disinfection. The ultra violet ray disinfection and ozone disinfection set forth above may enhance the effect of the chlorine agent to be mixed in the pool water.

The absorptive purification unit 26 comprises a tank filled with absorbent, such as zeolite, active carbon, silica gel or the like for removing ammonium generated from sweat, urine, bacteria dissolved by the disinfection unit 24, pigment, bound chlorine and the like contained in the pool water after filtration and disinfection, by absorption with the absorbing action of the absorbent. Any absorbent except for those potentially involving substances harmful to the human body, can be used. However, zeolite, active carbon, silica gel are preferred. Here, zeolite is particularly effective in absorbing and removing ammonium. Activated carbon is particularly effective in absorbing and removing odor components, pigments, bound chlorine of the pool water. Silica gel is particularly effective for selectively removing protein.

The ultramicro filtration unit 22 is adapted to separate and remove smaller virus, such as AIDS virus, *hemophilus influenza*, Japanese *encephalitis virus, hepatitis virus* and the like, and proteins. The ultramicro filtration unit 22 comprises a plurality of ultramicro filtration membranes, such as a hollow yarn membrane. The porous ceramic filter 20 is capable to filter out impurity particles having diameter approximately 0.2–0.5 $\mu$m or greater, such as bacteria including *colon bacillus, cholera vibrio, typhoid bacillus, pseudomonas aeruginosa* and so forth, but cannot filter out impurity particles having smaller diameters, among the impurities generated from the human body and contained in the pool water. Therefore, in the ultramicro filtration unit 22, substances having particle diameters on the order of 0.001–0.2 $\mu$m, such as proteins (e.g. 0.02–0.01 $\mu$m), virus (e.g. 0.01–0.2 $\mu$m), bacteria (e.g. 0.2–0.5 $\mu$m) which cannot be completely removed by the ceramic filter, are removed by the ultramicro filtration membrane 36, such as the hollow yarn membrane. However, the ultramicro membrane permits necessary ions, such as metal ions, e.g. $Na^+$ and the like, anions, e.g. $Cl^-$ and so forth, and molecules, to be retained in the pool water, to pass therethrough.

In the prior art, when filtration is performed for a large amount of the pool water with a fine filter, such as the ultramicro filter 38, blocking of the filter quickly occurs and prevents further filtration to continue. According to the present invention, ultramicro filtration of a large amount of the pool water is enabled by performing fine filtration of the pool water by the ceramic filter in advance of the ultramicro filtration.

For the ultramicro filtration unit 22 employed in the present invention, the back washing unit 30 is provided to prevent the filtration efficiency of the ultramicro filtration membrane 36 from being lowered, to constantly maintain high efficiency and to reduce frequency of exchanging of the expensive ultramicro filtration membrane. The back washing unit 30 comprises a tank 37 for supplying not shown washing water, a pump 38 and an ultrasonic wave generator 39 connected to a not shown driving power source. The back washing of the ultramicro filtration unit 22 is performed by closing valves 40a and 40b and opening valves 40c and 40d which are held in closed position, to flow the washing water into the outlet side of the ultramicro filtration unit 22 from the tank 37 by operation of the pump 38 and thus to cause reverse flow from the inside of the ultramicro filtration membrane 36 to the outside thereof for flowing out the fine impurity particles trapped in the ultramicro filtration membrane 36. The washing water containing the fine impurity particles resulting from the back washing is drained through a bypass pool outlet of the ultramicro filtration unit 22 and the valve 40d. At this time, an ultrasonic wave directed from the outer periphery of the ultramicro filtration unit toward the center is generated by the ultrasonic wave generator 39 to assist removal of the trapped fine impurity particles by back washing for enhancing efficiency of the back washing.

Here, the ultramicro filtration membrane to be employed in the present invention is not specified and can be any known ultramicro filtration membrane, i.e. hollow yarn membrane. For instance, Kurare UF filter (made by Kurare) can be a typical example. In addition, either hollow yarn membrane to perform ultramicro filtration from outside to inside or from inside to outside can be used.

The ultrasonic wave generator employed in the present invention is not particularly limited and can be selected from any of those capable of applying ultrasonic wave to the ultramicro filtration membrane by, for example, arranging a ultrasonic oscillation plate around the ultramicro filtration membrane entirely or with a given interval.

The fine filtration unit 21 is a unit for purifying the pool water by filtering out fine particles, e.g. fine particles in the order of 0.25–1 μm, of organic substances, impurities, bacteria or so forth, such as metal salts, oils, dirt introduced or generated in the pool water. Within the filtration unit 21, a plurality of porous ceramic filters 20a according to the first aspect of the invention, which can filter out fine particles on the order of 0.25–1 μm, are set. For instance, 100–150 porous ceramic filters are set in the filtration unit 21.

The basic idea of purification of the water and other liquid has been proposed by the applicant in the co-pending U. S. patent application Ser. No. 721,087, filed on Jun. 25, 1991, corresponding European Patent Application has been published under the Publication No. 0494334. The disclosure of the above-indentified co-pending application is herein incorporated by reference.

The pool water purifying porous ceramic filter (hereafter referred to as "ceramic filter") 20 has very fine voids arranged three-dimensionally so as to filtrate not only the fine particles, such as bacteria, but also oils excreted from the human body. The construction of the ceramic filter is shown in FIGS. 3(a) and 3(b).

Figure 3A:
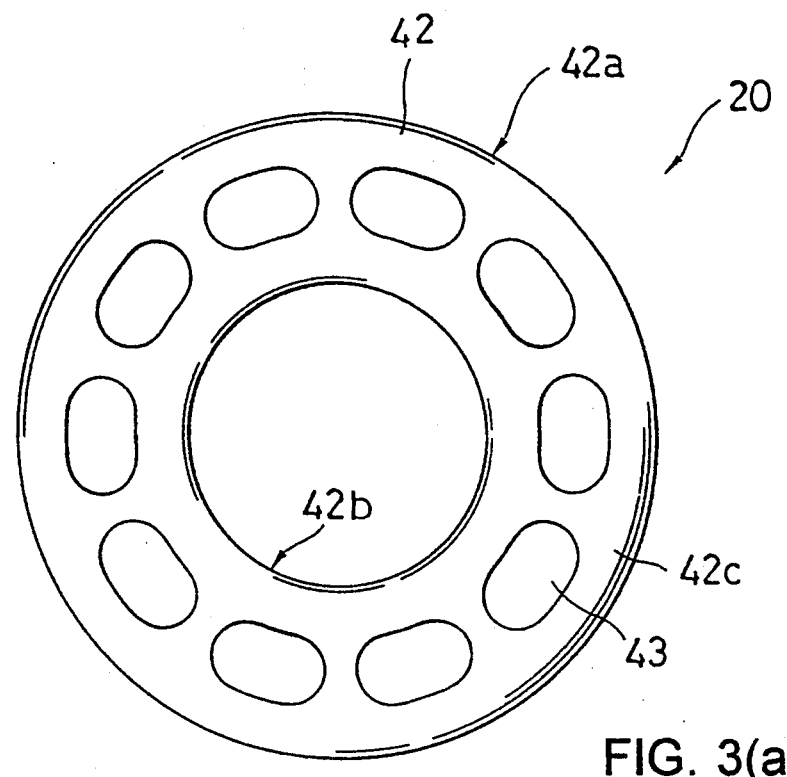
FIGS. 3(a) and 3(b) are a top plan view and a section of one embodiment of a liquid purifying porous ceramic filter according to the present invention.
Figure 3B:
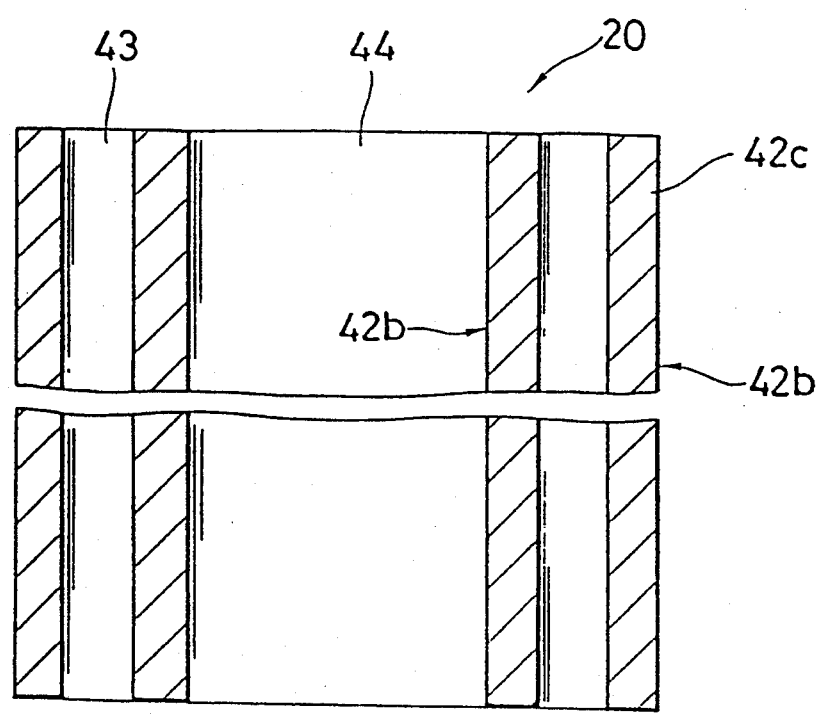

As shown in FIGS. 3(a) and 3(b), the ceramic filter, according to the present invention comprises a cylindrical body 42 which has an outer peripheral surface 42a and an inner peripheral surface 42b. Through a wall portion 42c of the cylindrical body 42, a plurality of through holes 43 arranged in circumferential alignment. In the shown embodiment, ten through holes 43 are formed through the cylindrical body 42, and each individual through hole 43 is formed into an elongated circular configuration in cross section. It should be noted that, however, the number and configuration of the through holes are not particularly limited. The through holes 43 formed through the wall portion 42c of the cylindrical body 42 are adapted to permit flow of the pool water which is filtrated through the first stage filtration. Accordingly, the ceramic filter 20 can be effectively used in the following two ways.

(1) For effective use, the cylindrical body 42 is pre-coated with a filter aid not only on the outer peripheral surface 42a but also on the inner peripheral surface 42b. The pool water to be filtrated is introduced into a central through opening 44 so that the pool water to be filtrated contacts with both of the outer and inner peripheral surfaces 42a and 42b, and the purified or filtrated pool water is collected through the through holes 43. In this way, the pool water processing performance can be significantly improved.

(2) In the alternative, it is also possible, in the above-mentioned ceramic filter, to apply pre-coating of the filter aid on the outer peripheral surface 42a of the cylindrical body 42, and, in addition, on the inner periphery (particularly, the inner periphery at the radially inner side) of the through holes 43. In this case, the pool water to be filtrated is contacted with the outer peripheral surface 42a to pass the pool water into the through holes 43 for the first stage filtration. In addition, the first stage filtrated pool water in the through holes 43 further passes into the central opening 44 for additional secondary stage filtration. Therefore, the two stage filtrated highly purified pool water can be collected through the central through opening 44. In this way, the purity of the pool water can be remarkable improved.

Figure 4A:
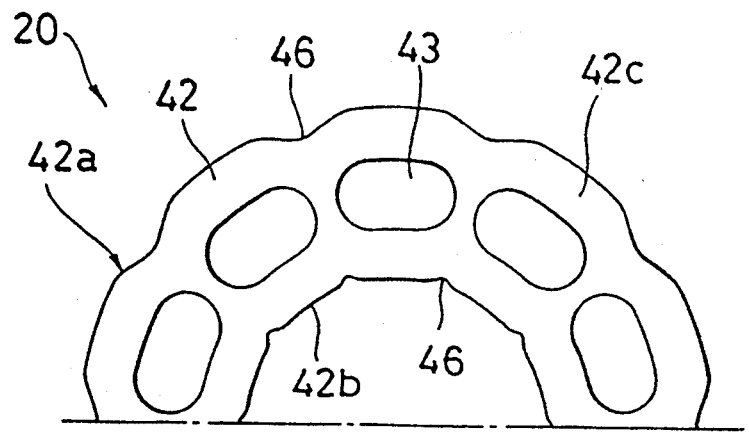
FIGS. 4(a), 4(b) and 4(c) are partial top plan views showing modifications of the liquid purifying porous ceramic filters of the invention.
Figure 4B:
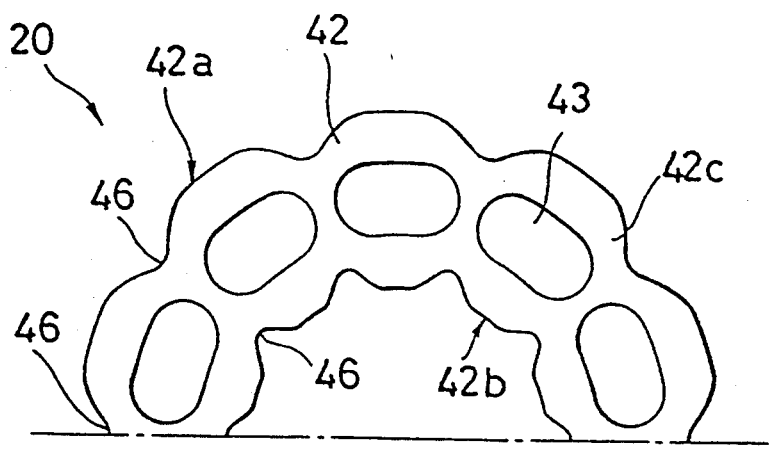
Figure 4C:
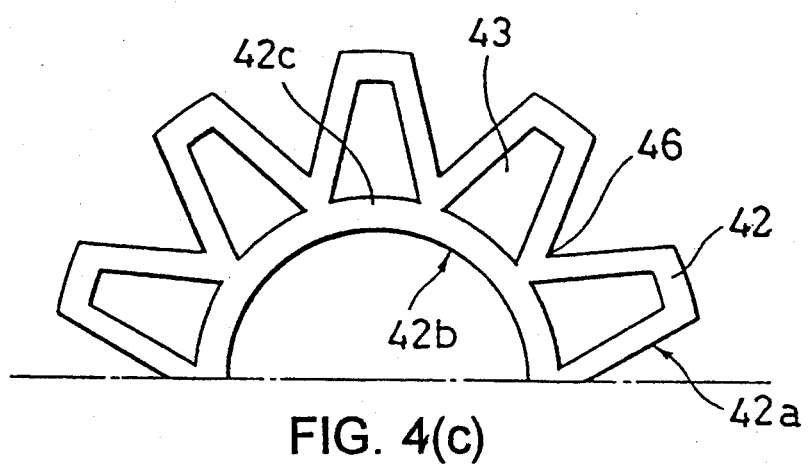

The ceramic filter 20 according to the first aspect of the present invention is designed to increase the contact area with the pool water to be processed by increasing the processing area. Accordingly, further increased processing area can be obtained by providing an uneven surface 46 on the outer and inner peripheral surfaces 42a and 42b of the cylindrical body 42, as illustrated in FIGS. 4(a), 4(b) and 4(c). For instance, the ceramic filter 20 shown in FIG. 3(a) and the ceramic filter 20 shown in FIG. 4(a) can respectively provide 1.47 times and 1.65 times greater processing area and accordingly processing performance, than the conventional plane cylindrical ceramic filter.

The porous ceramic filter 20 according to the present invention is fixedly disposed on the bottom 48a of a housing tank 48 of the fine filtration unit 21, in a form of a pool water purifying filter assembly (hereafter referred to as "filter assembly") 50, as shown in FIGS. 5(a), 5(b), 6(c) and 6(d). As seen, the filter assembly 50 comprises a cover 51 and a jacket 52 with the ceramic filter 20 disposed therebetween. The filter assembly 50 is fixed to the bottom 48a of the housing tank 48 with the threaded portion 53 on the bottom of the jacket 52.

The filter assembly 50 shown in FIG. 5(a)–FIG. 6(d) comprises the cover 51, the jacket 52, the ceramic filter 20, and a stud 54 and a nut 55 for securing the ceramic filter 20 between the cover 51 and the jacket 52.

Figure 5A:
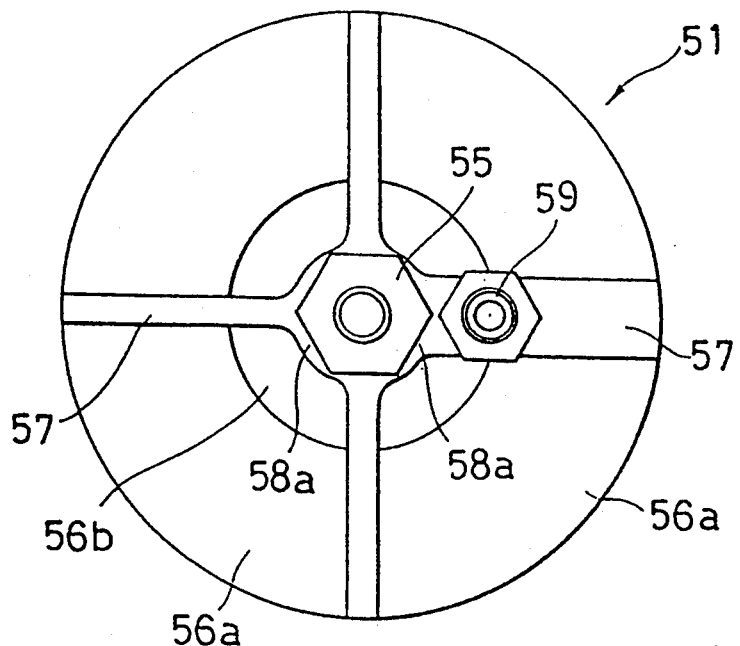
FIGS. 5(a) and 5(b) are a top plane view and a section of one embodiment of a liquid purifying filter assembly according to the present invention.
Figure 5B:
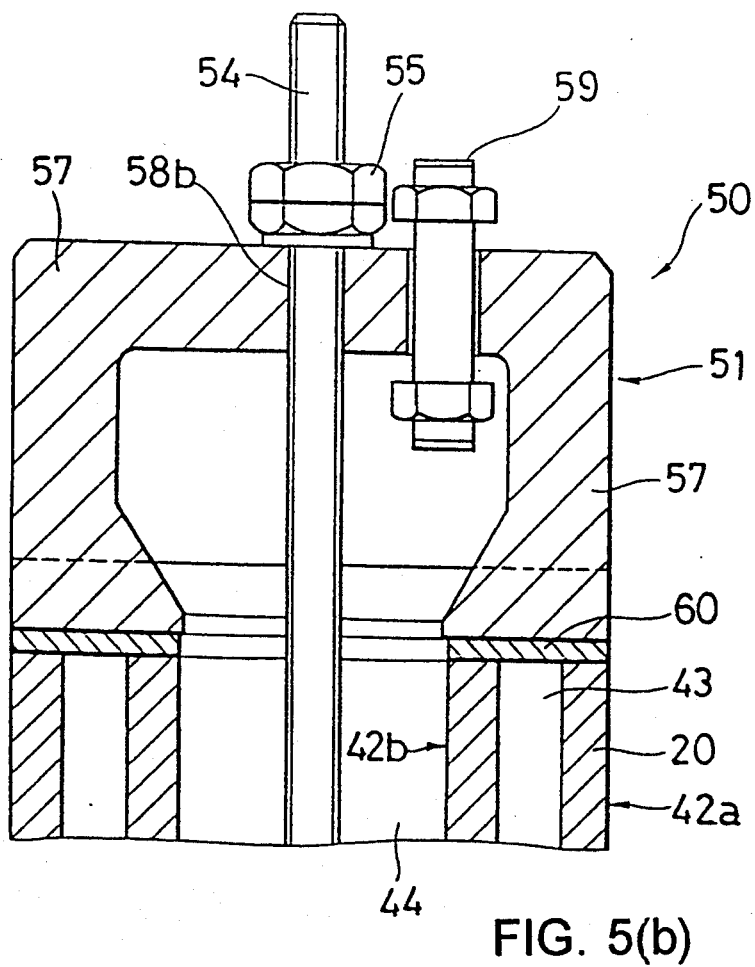

As shown in FIGS. 5(a) and 5(b), the cover 51 has an opening 56b having substantially equal internal diameter to that of the central through opening 44 of the ceramic filter 20, at the center thereof. The cover 51 also has an annular disc-shaped circumferential portion 56a which blocks the top ends of the through holes 43 of the ceramic filter 20. Four essentially L-shaped arm members 57 are arranged on the circumferential portion 56a with substantially 90° of angular interval and extended vertically to intersect to each other at the center above the opening 56b. A support portion 58a defining an opening 58b to permit the stud 54 to extend therethrough, is formed at the intersection of the arm members 57. In the shown embodiment of the cover 51, one of the four arm members 57 is provided thicker wall thickness than those of the others. A nozzle 59 is mounted on the thicker arm member 57 for washing the central through opening 44 of the ceramic filter 20. A one touch coupler for shower washing is mounted on the nozzle 59. A packing 60 is disposed between the cover 51 and the mating end of the ceramic filter 20.

Figure 6C:
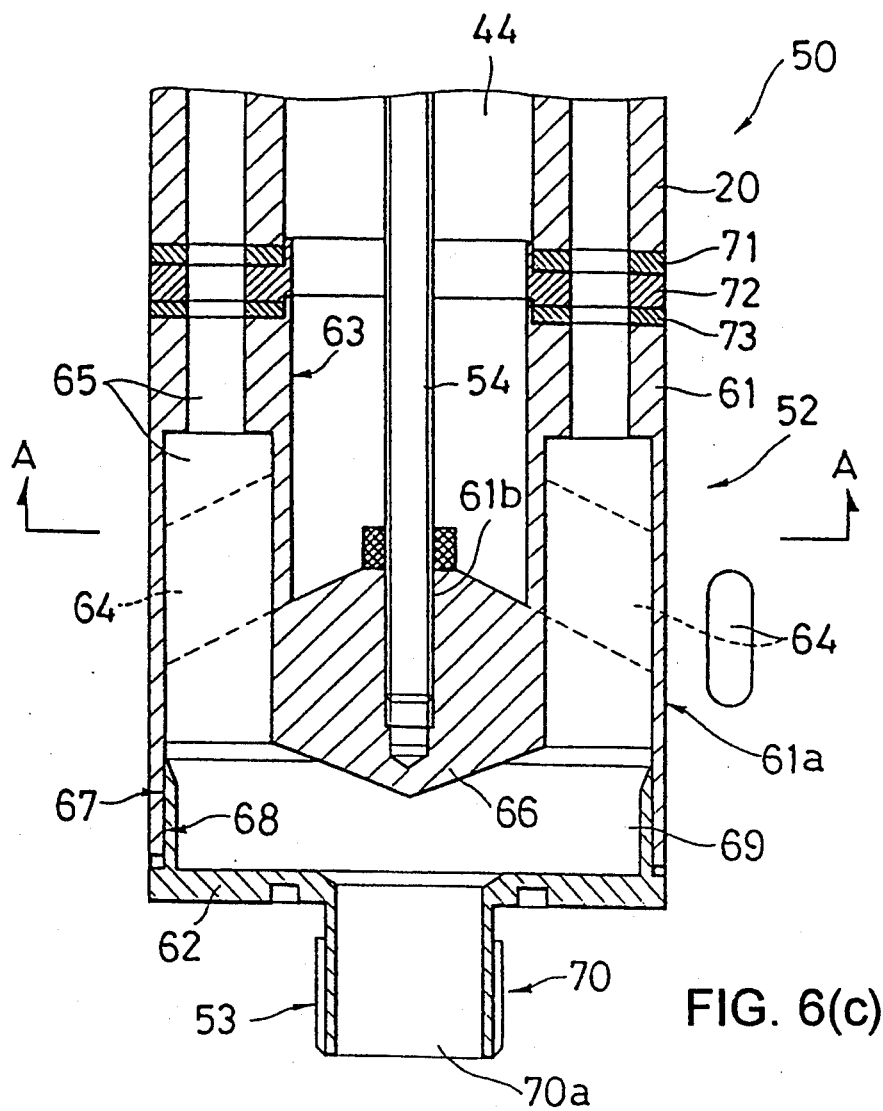
FIGS. 6(c) and 6(d) are section of the lower portion and a cross section taken along line A—A, of one embodiment of the liquid purifying filter assembly of the invention.

On the other hand, as shown in FIG. 6(c), the jacket 52 comprises a jacket body 61 and a jacket cover 62. The jacket body 61 is formed into a cylindrical body defining a center hole 63 having a diameter substantially equal to that of the central opening 44 of the ceramic filter 20. The center hole 63 is aligned with the central opening 44 of the ceramic filter 20 at the top end thereof. The lower end of the center hole 63 is closed with a bottom defining a thread boss 61b at the center thereof, to which the stud 54 engages. A plurality off e.g. ten in the shown embodiment, communication holes 64 are defined in the vicinity of the upper end of the jacket body 61. The communication holes 64 extend in oblique relative to the axial direction. Also, the jacket body 61 defines a plurality of through holes 65 at corresponding positions to the plurality of through openings 43 of the ceramic filter 20, at the radially outside of the center hole 63. In the shown embodiment, the through holes 65 form flow paths for flowing the purified or filtrated pool water. In the shown embodiment, ten through holes 65 are formed corresponding to the through holes 43 of the ceramic filter 20 in one by one basis. As shown, each of the through holes 65 is expanded the cross sectional area at the intermediate portion. The jacket body 61 is formed with an internal thread 67 on the inner periphery at the lower end. The thread 67 is adapted to engage with an external thread 68 formed on the jacket cover 62 so that the jacket cover 62 can be fixedly secured in liquid tight fashion on the lower end of jacket body 61. A space 69 is thus defined between the lower end of the jacket body 61 and the jacket cover 62. An outlet opening 70a communicating with the space 69 is formed at the lower side of the jacket cover 62 with a downward extension 70. The threaded portion 53 is formed on the outer periphery of the downward extension 70. As can be appreciated, the jacket body 61 is provided with ten communication holes 64 for flowing the non-filtrated pool water and through holes 65 for flowing the purified or filtered pool water, and thus twenty in total, are formed in alternate fashion.

The lower end of the ceramic filter 20 is fixed to the jacket 52 via a packing 71, a stainless ring 72 and a packing 73. The packing 71, the stainless ring and the packing 73 are formed to have essentially the identical cross sectional configuration to that of the ceramic filter 20 so that the peripheral through holes 43 of the ceramic filter 20 communicate exclusively with the through holes 65, and the central opening 44 of the ceramic filter 20 communicates exclusively with the center hole 63 of the jacket 52. Therefore, the filtrated water and the non-filtrated water will never mix together. Here, as the packings 60, 71 and 73, normal liquid packing, such as *bitten packing, rubber packing, for example, silicon rubber, teflon, fluorinated rubber and so forth can be used.

The filter assembly 50 is assembled into the integrated unit. In assembling, the jacket 52, the packing 73, the stainless ring 72, the packing 71, the ceramic filter 20 and packing 60 are piled in order from the bottom. Then, the stud 54 is threaded into the threaded bore 63 through the center hole 63 of the jacket 52 for implantation. Thereafter, the cover 51 is piled with extending the top end of the stud 54 through the opening 58b. The nut 55 is engaged to the threaded portion of the stud 54 extending from the support portion 58a. By tightening the nut 55, all components are firmly fixed to form the integrated assembly.

Here, the cover 51 is not limited to that illustrated, but can have the construction of a single disc with an opening communicated with the central opening 44 of the ceramic filter 20. Also, the jacket 52 may be constructed into the configuration, in which the jacket body 61 and the jacket cover 62 are formed integrally.

In the filter assembly 50 constructed as set forth above, the various filter aids supplied from the filter aids supply unit 32 which will be discussed later, are preliminarily coated on the outer and inner peripheral surfaces 42a and 42b of the ceramic filter 20. Then, the filtrating pool water introduced into housing tank 48 is introduced into the central opening 44 of the ceramic filter 20 through the opening 56b of the cover 51 so that the filtrating pool water contacts not only on the outer peripheral surface 42a but also the inner peripheral surface 42b under pressure to absorb the impurities in the pool water primarily on the filter aid, and further filter out with the filter 20 all except for the purified water which flows into the through holes 43. The purified water flowing into the through holes 43 flows out of the filter assembly 50 through the through holes 65, the space 69 and the outlet opening 70a. On the other hand, the non-filtrated water introduced into the central opening 44 but not filtrated flows out of the filter assembly through the center hole 62 and the communication holes 64 of the jacket 52 for further filtration.

On the other hand, during back washing of the filter unit 50 by means of the back washing unit 28 which will be discussed later, gaseous and liquidous two phase jet water stream is introduced through the outlet opening 70a of the jacket 52. The jet water stream is introduced into the through holes 43 through the space 69 and the through holes 65. The jet water stream in the through holes 43 is injected toward the outer peripheral surface 42a and the inner peripheral surface 42b of the ceramic filter 20 to sweep out the impurities trapped in the ceramic filter 20 as well as the filter aids and the slurry on the outer and inner peripheral surfaces 42a and 42b. After back washing, the outer peripheral surface 42a is washed once again by a shower through a nozzle provided in the housing tank 48. Also, the inner peripheral surface 42b is washed once again with a shower through the nozzle 59 by connecting a water hose to the one touch coupler of the nozzle 59. The resultant water of washing the central through opening 44 of the ceramic filter 20 flows out of the filter through the center hole 63 and the communication holes 64 of the jacket 52. As set out above, the shown assembly can smoothly perform both the filtration of a large amount of pool water and the back washing of the ceramic filter 20.

Figure 7A:
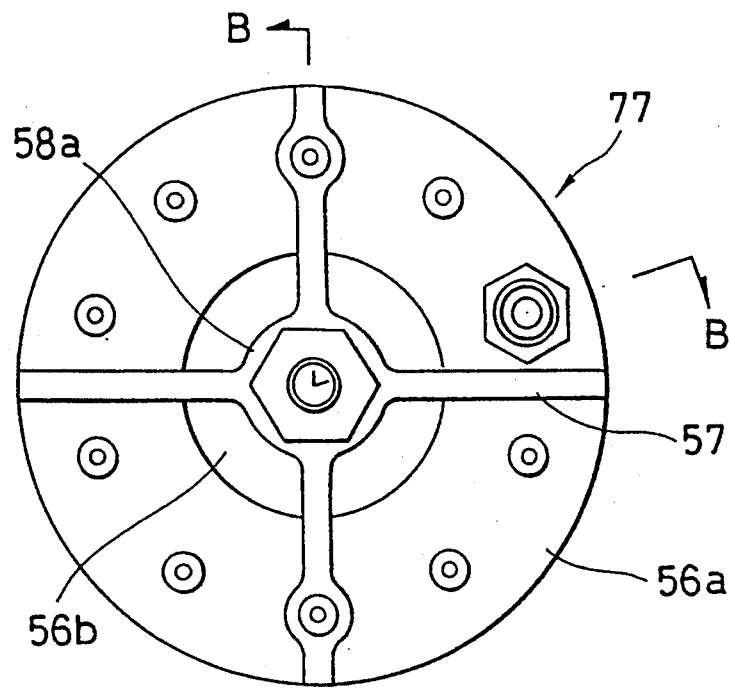
FIG. 7(a) and 7(b) are top plan view and a section of the upper portion of another embodiment of a liquid purifying filter assembly of the invention.
Figure 7B:
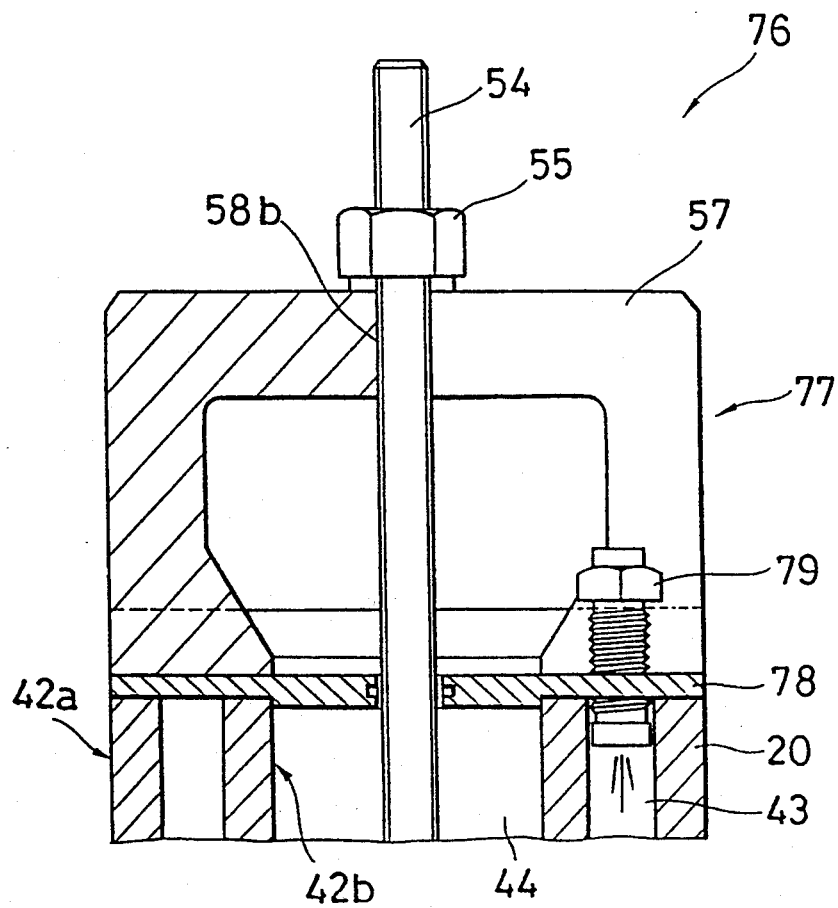

Although the filter assembly 50, according to the third aspect of the invention, for using the ceramic filter 20 of the present invention, for achieving increased amount of filtration is basically constructed as set forth above, a filter assembly 76, according to the fourth aspect of the invention, as illustrated in FIGS. 7(a), 7(b) and 8(c), can be used for improving filtration performance. Since the filter assembly 76 is substantially identical to the filter assembly 50 except for ceratin portion, the common elements will be represented by the same reference numerals and the discussion therefore is neglected for simplification of the disclosure.

The filter unit 76 is formed by integrating a cover 77, a packing 78, the ceramic filter 20, the packing 71, the stainless ring 72, the packing 73 and the jacket 80 by means of the stud 54 and the nut 55. As shown in FIGS. 7(a) and 7(b), the cover 77 of the filter assembly 76 is differentiated from the cover 51 of FIGS. 5(a) and 5(b) for the necessity of the nozzles 79 to be provided for respective positions corresponding to a plurality of the through holes 43. In addition, these nozzles 79 are adapted to be normally closed and open only when the water hoses are connected. For the purpose of illustration, only one nozzle 79 is shown and other nozzles are neglected from illustration, and further more, the nozzle 79 is represented by a nozzle mounting screw provided in the cover in the shown manner. In addition, in case that the nozzle 79 is mounted on the arm member 57, the thickness of the arm member is increased. The cover 77 is required to define the center opening 56b which permits the stud 54 to extend therethrough. The packing 78 is required to block the central through opening 44 of the ceramic filter 20.

Figure 8:
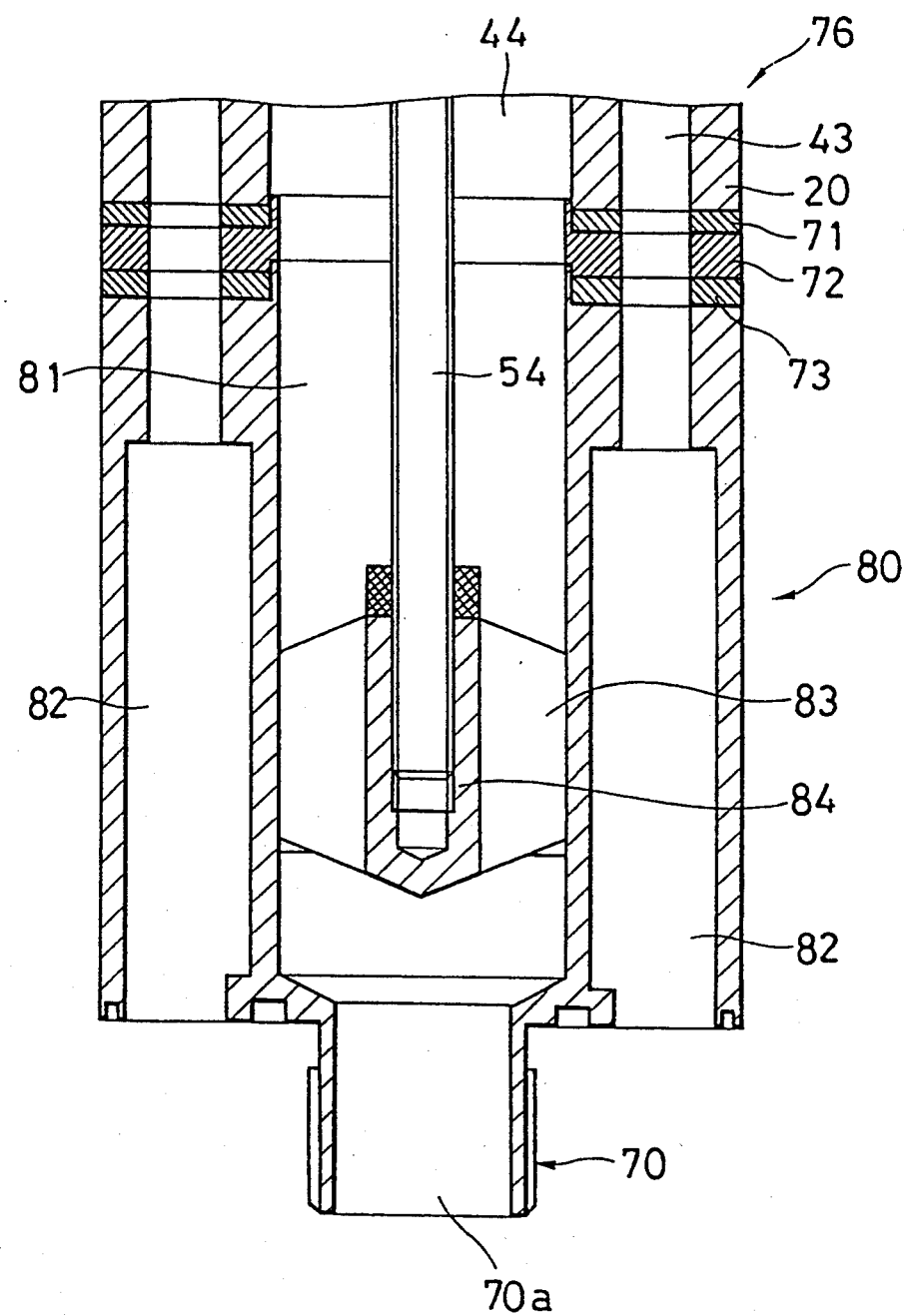
FIG. 8 is a section of the lower portion of another embodiment of a liquid purifying filter assembly of the invention.

On the other hand, as shown in FIG. 8, the jacket 80 defines a center hole 81 which communicates with the central through opening 44 of the ceramic filter 20. The through holes 82 communicate with the through holes 43 of the ceramic filter 20 and extend to the lower end of the jacket 52. However, the through openings 82 are designed to be closed by the bottom 48a when it is installed on the housing tank 48. A plurality of brackets 83 extend from the inner periphery to the center opening 81 to support a supporting member 84 for supporting the stud 54, at the center. The female threaded boss 61b for engaging with the stud 54 is formed at the center of the supporting member 84. The stud 54 is fixed by thread engagement with the female threaded portion so that the jacket 80, the filter 20 and the cover 77 are integrally assembled.

In purification of the pool water, the filter aids are pre-coated on the outer peripheral surface and preferably on the inner peripheral surface (particularly on the surface at the radially inside) of the ceramic filter 20. Then, the pool water is contacted on the outer periphery of the ceramic filter 20 for removing the impurity by absorbing on the filter aids and trapping in the filter. The pool water filtrated through first stage or primary filtration is introduced into the through holes 43. The pool water in the through holes 43 is again removed of impurity by the filter aids and the filter wall and then introduced into the central opening 44 as highly purified second stage filtrated pool water. The pool water in the central opening 44 flows out of the fine filtration unit 21 from the outlet opening 70a via the center hole 81 of the jacket 80.

At the bottom 48a of the housing tank 48, valves are provided at the corresponding positions to the through holes 82 of the jacket 80. Upon back washing, these valves are held open. During the back washing, the jet water stream is introduced into the central through opening 44 via the outlet opening 70a and the center hole 81 of the jacket 80. By this, the inner peripheral surface 42b of the through holes 43 and the outer peripheral surface 42a can be washed. Here, it is possible to wash the ceramic filter 20 by introducing the jet water stream through the through holes 82 of the jacket 80. Before and after washing of the ceramic filter 20 by the jet water stream, the outer peripheral surface 42a is washed by the shower of the housing tank 48, and the through holes 43 are washed by the shower through the nozzles 79 of the cover 77.

The pool water purifying filter assemblies (units) according to the third and fourth aspects are constructed as set forth above.

The filter aid supply unit 32 is designed to be filled with the filter aids for forming the filter aid layer for constantly maintaining satisfactory performance of the ceramic filter 20 of the fine filtration unit 21 and facilitating washing. The filter aids are supplied to the ceramic filter 20 in the filtration unit 21 by means of the slurry pump 34. Namely, since the ceramic filter 20 has fine voids, it can be easily and quickly blocked when it is directly used for filtration to lower the filtration performance in short period to become impossible to continue filtration. Therefore, the ceramic filter is generally used with forming the filter aids which can be easily removed, on the flow-in side surface. As the filter aids, powder state filter aid, such as diatomaceous earth, lime or the like, fiber state filter aid, such as cellulose, pulp fiber, asbestos or the like, and silica gel which can selectively remove proteins, are preferred to be used. Accordingly, it is preferred to form on the flow-in side of the ceramic filter a peelable layer of the powder state filer aid which can be easily removed, and filtration layer of the fiber-state filter aid and the silica gel layer on the peelable layer.

The back washing unit 28 is designed to perform removal of the filter slurry accumulated in the ceramic filter and washing of the ceramic filter before lowering of the filtration efficiency, for example every given period, in order to constantly maintain the high filtration performance of the ceramic filter 20 in the filtration unit 21. The back washing unit 28 generates a high pressure air containing washing water stream for generating reverse flow and for injection. Namely, the back washing unit 28 generates a jet water stream formed by washing water and high pressure air supplied from a not shown high pressure air source, and comprises a not shown circulation circuit for accelerating the flow velocity of the washing water and a mixer for mixing the high pressure air and the accelerated washing water. However, the construction of the back washing unit is not specified to the construction set forth above.

In the pool water purification plant 10 according to the fifth aspect of the invention, and basically constructed as set forth above, the pool water overflown from the pool 12 flows into the overflow tank 14. Then, relatively large impurities, such as air, rubber band and so forth are removed by the pre-filters 16a and 16b, such as the carbon filter. Then, the pool water flows into the fine filtration unit 21, in which a plurality of the porous ceramic filters 20 according to the first aspect of the invention are arranged in the housing tank, by the operation of the circulation pumps 18a and 18b. Next, the pool water purified through the fine filtration by the ceramic filters 20 flows into the ultramicro filtration unit 22 to be subjected to ultramicro filtration. Subsequently, the disinfection for the purified water is performed by the disinfection unit 24 employing the ultraviolet ray and ozone. Thereafter, the pool water is introduced into the absorptive purification unit 26 employing active carbon and so forth for removing offensive odor component, such as ammonia and so forth, and disinfected virus and bacteria by absorption. Then, the pool water is recirculated to the pool 12.

Figure 9:
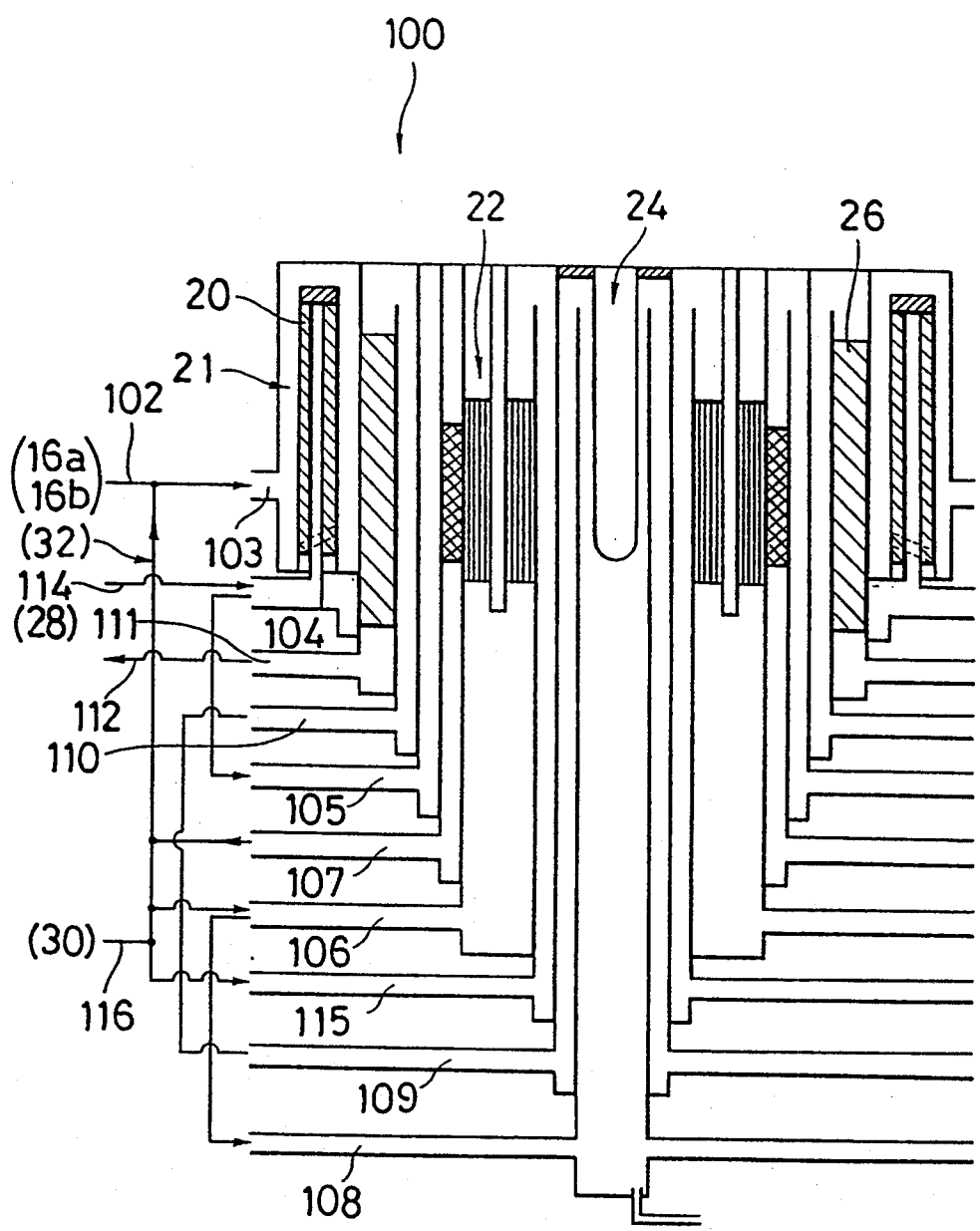
FIG. 9 is a section of another embodiment of a liquid purification plant according to the invention.

FIG. 9 shows a pool water purification plant according to the sixth aspect of the invention, in which the fine filtration unit employing the porous ceramic filter 20 according to the first aspect of the invention, the ultramicro filtration unit, the absorptive purification unit and the disinfection unit are integrally incorporated.

In the shown pool water purification plant 100, the disinfection unit 24 is placed at the center. The ultramicro filtration unit 22 and the absorptive purification unit 26 are concentrically arranged in order toward the outside. The fine filtration unit 21 employing the ceramic filter 20 according to the present invention is arranged on the outermost position. The unitary formed units are housed within a housing which defines flow path for the pool water to respective units. Also, the unitary formed units incorporate necessary piping. Of course, the pool water purification plant 100 further incorporates the overflow tank 14, the pre-filters 16a and 16b, the pumps 18a and 18b, the back washing units 28 and 30, the filter aid supply unit 32 and the slurry pump 34, similarly to the pool water purification plant 10 of FIG. 1.

The pool water flows out from the pool 12 and after being removed of relatively large impurities by the pre-filters 16a and 16b is introduced through an inlet line 102 and an induction pipe 103. The part of the purified pool water by fine filtration by means of the ceramic filters 20 according to the present invention is discharged from a discharge pipe 106 through the ultramicro filtration unit 22. On the other hand, the pool water over flown without being subjected to the ultramicro filtration, flows through a discharge pipe 107. The pool water discharged from the discharge pipe 107 is recirculated to the inlet line 102. To the recirculating flow of the pool water through the external piping, a small amount of filter aid is added from the filter aid supply unit 32 via a supply line. Then, the recirculated pool water with the small amount of the filter aid is mixed with the new non-processed pool water and introduced into the fine filtration unit 21 through the induction pipe 103 to be subjected to the fine filtration.

The pool water discharged through the discharge pipe 106 and purified through the ultramicro filtration, is introduced into the disinfection unit 24 through an induction pipe 108. Disinfection by means of the ultraviolet ray and the ozone are performed. Then, the disinfected pool water flows through a discharge pipe 109 and introduced into the absorptive purification unit 26 via an induction pipe 110. After completion of the absorptive purification, the completely purified pool water is discharged through an outlet pipe 111 and recirculated into the pool 12 through a recirculation line 112.

To the discharge pipe 104 of the fine filtration unit 21, a back washing line 114 extending from the back washing unit 28 is connected for enabling back washing of the ceramic filters 20. Similarly, to the discharge pipe 106 and the induction pipe 115 of the ultramicro filtration unit 22, a back washing line 116 extending from the back washing unit 30 is connected to enable back washing of the ultramicro filtration membrane in the ultramicro filtration unit 22. Also, an ultrasonic oscillation plate which is operable during back washing, is mounted on the ultramicro filtration unit 22.

It should be appreciated that, in the pool water purification plants according to the fifth and sixth aspects of the present invention, the ultramicro filtration unit is not essential and not always required. Particularly, when increasing the purification processing amount is the most important task to be achieved, the ultramicro filtration unit will be unnecessary.

Figure 2:
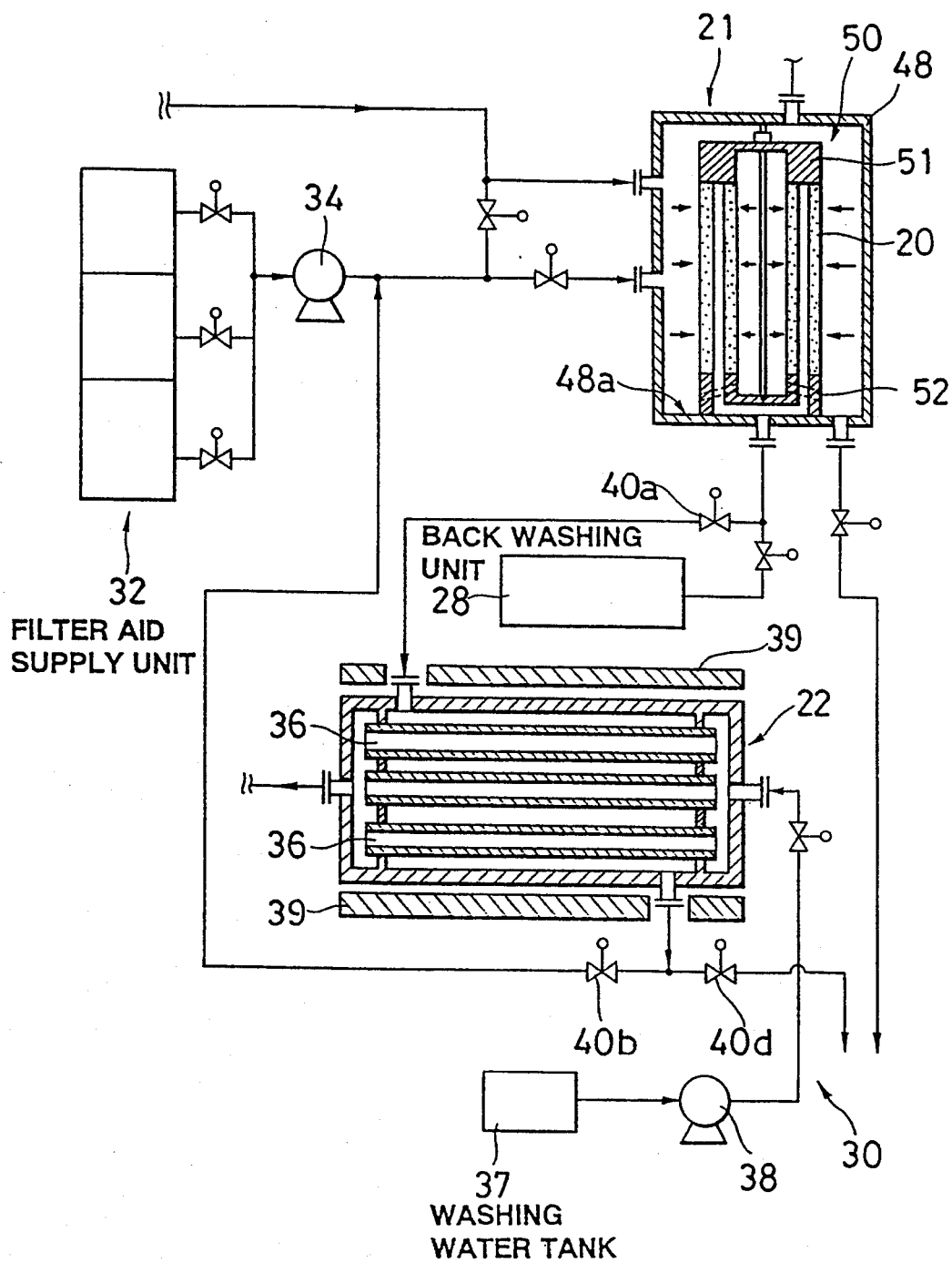
FIG. 2 is a schematic explanatory illustration showing one example of the major part of the pool water purification plant of FIG. 1.

Since one or more water purifying porous ceramic filter assemblies according to the third and fourth aspect of the invention are disposed in the housing tank of the filtration unit 21 as shown in FIGS. 1 and 2, each filter assembly can have substantial length depending upon the length of the housing tank. When there is no sufficient length of the ceramic filter 20 or the sufficient length of the ceramic filter is not available, it is possible to obtain a desired length of a ceramic joined filter body by joining a plurality of short ceramic filters 20 via joining members, as in the joined porous ceramic filter according to the second aspect of the present invention. With this construction, it becomes unnecessary to use a long ceramic filter which is cumbersome in handling and thus makes handling of the ceramic filters easier. In addition, even when the length of the ceramic filters to be used is different depending upon the plants, the length can be adapted by joining a plurality of short ceramic filters to enable mass production of a common length of ceramic filters to permit lowering of the production cost.

Figure 10:
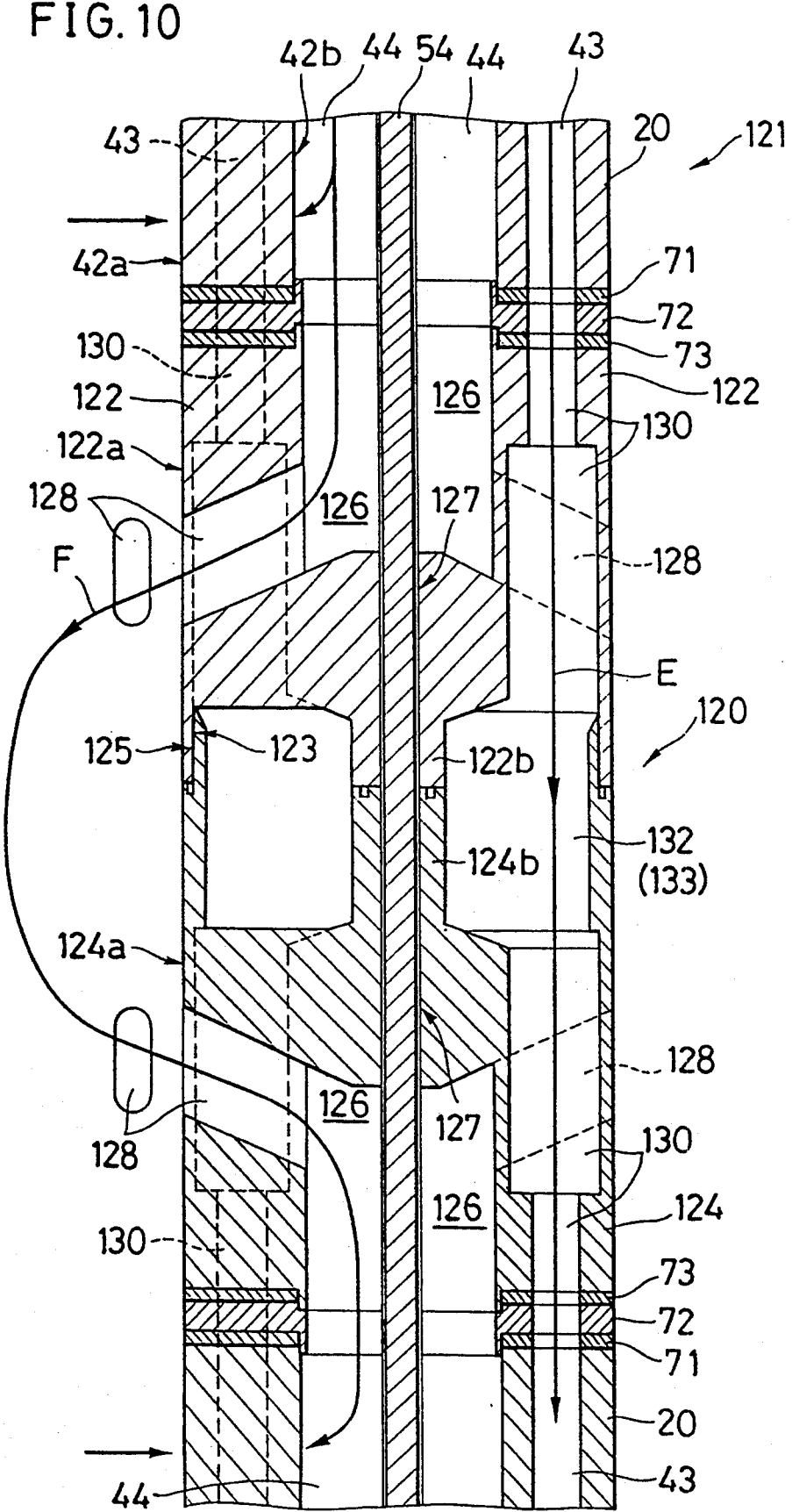
FIG. 10 is a longitudinal section of one embodiment of a liquid purifying laminated porous ceramic filter of the invention.

FIG. 10 shows one embodiment of a liquid (pool water) purifying porous ceramic joined filter body according to the second aspect of the invention. Namely, there is shown a longitudinal section of one embodiment of the ceramic joined filter body, in which two ceramic filters are joined through a joining member. Here, in FIG. 10, two ceramic filters 20 illustrated in FIGS. 3(a) and 3(b) are joined through a joining member 120 to form a joined filter body 121, which joined filter body is illustrated as the longitudinal section viewing the ceramic body 20 from line D—D of FIG. 3(a).

Here, the joining member 120 comprises a first member 122 and a second member 124, which have the same construction at the portions interfacing with the ceramic filters 20. A thread portion 123 on the inner periphery of the lower end of the first member 122 engages with a thread portion 125 on the outer periphery of the upper end of the second member 124 for establishing liquid tight fixed engagement via an O ring or the like. Joining portions between both members and the ceramic filters 20 have similar construction as the joining portion of the jacket 52 shown in FIG. 6(c). Namely, both members 122 and 124 are formed with cylindrical body defining central openings 126 having approximately the same diameter to corresponding central through opening 44 of the ceramic filter 20 at the joining end. The other end of the central opening 126 is closed. At the center of the closed end of the central opening 126, a through hole (which may be a threaded hole) 127 having substantially the equal diameter to the stud 54 for receiving the latter. In the circumferential portion around the central opening 126 of the closed end, a plurality of (ten in the shown case) communication holes 128 for establishing communication between the central opening 126 and the outer peripheral surfaces 122a and 124a, are formed in oblique relative to the longitudinal axis. Each of the communication holes 128 are formed into an elongated circular cross section. Through the wall portion between the central opening 126 and the outer periphery 122a or 124a, a plurality of through holes 130 are formed corresponding to a plurality of the through holes 43 of the ceramic filter 20, so that they may be communicated with the through holes 43. In the shown embodiment, the through holes 130 form flow paths for flowing the purified pool water. Ten through holes 130 are formed to correspond to the through holes 43 of the ceramic filter 20 on a one-to-one basis. Each through hole 130 is expanded the cross sectional area at the intermediate portion. On the other hand, at the joining ends where both members 122 and 124 are joined, the external thread portion 123 and the internal thread portion 125 are formed on the outer and inner peripheries. Also, cylindrical extensions 122b and 124b abutting to each other via an O ring or the like in liquid tight fashion, are extended at the central portion. A recess 133 is formed at the radially outside of the cylindrical extension 124b of the second member 124 so that when thread engagement between both members is established, a continuous space 133 for communication with the through openings 130 of both members is defined.

Connection between the ceramic filter 20 and the connecting member 120 is established through the packing 71, the stainless ring 73 and the packing 73 similarly to those used in connection with the jacket 52 (see FIG. 6(c)).

With such construction, the purified pool water flows from the through hole 43 in the upstream side ceramic filter 20 to the through hole 43 of the downstream side ceramic filter 20 through the through hole 130 of the first member 122, the space 132 and the through hole 130 of the second member 124, as shown by arrow E. On the other hand, the non-purified pool water flowing down through the central through opening 44 of the upstream side ceramic filter 20 reaches the outer periphery 122a through the central opening 126 of the first member 122 and the communication holes 128, enters into the communication holes 128 of the second member from the outside of the outer periphery 124a and flows into the central opening 44 of the downstream side ceramic filter 20 through the communication holes 128 and the central opening 126 of the second member 124. With this construction, by mixing the non-purified pool water in the outside and inside of the ceramic filter 20 and re-introducing the mixed non-purified pool water into the central opening 44, efficiency of purification of the pool water can be improved.

On the other hand, although the embodiment of FIG. 10, employs the connecting member 120 which can mix the non-purified water in the central through opening 44 with the water outside of the ceramic filter and return to the central through opening 44 thereafter, for connecting two ceramic filters 20, when the central through openings 44 and the through holes 43 are simply adjoined, two ceramic filters 20 can be joined through the packing 71, the stainless ring 72 and the packing 73.

Next, another embodiment of the porous ceramic joined filter body according to the second aspect of the present invention and the porous ceramic filter to be employed therein will be discussed hereinbelow.

Figure 11A:
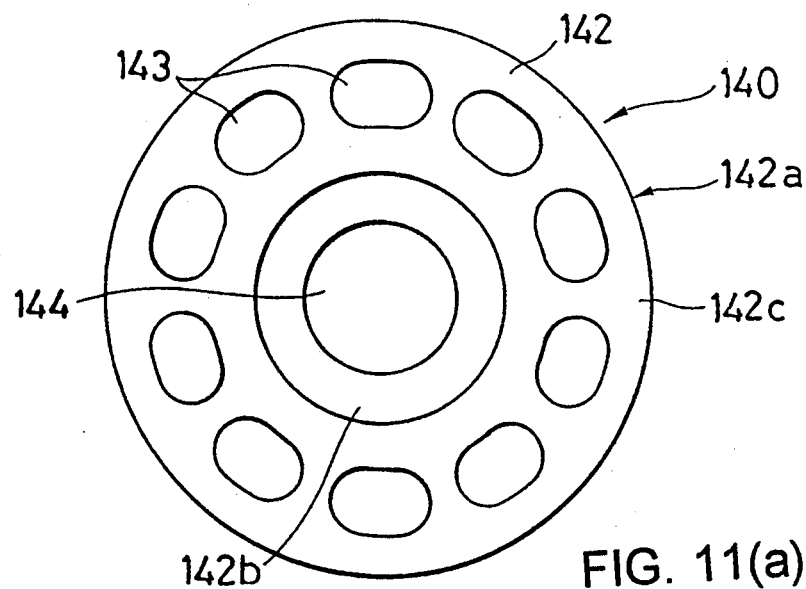
FIGS. 11(a), 11(b), and 11(c) are a top plan view, a longitudinal section and a bottom view of another embodiment of a liquid purifying porous ceramic filter of the present invention.
Figure 11B:
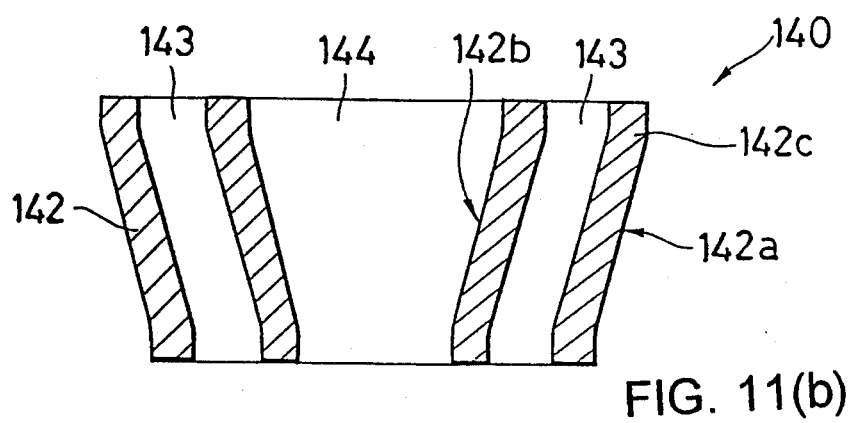
Figure 11C:
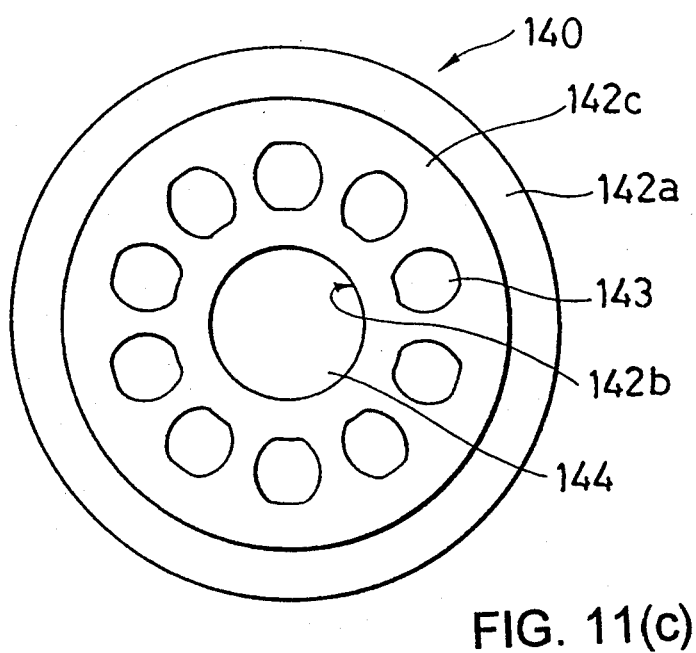

FIGS. 11(a), 11(b) and 11(c) respectively show the top plane view, the longitudinal section and the bottom view of one embodiment of the porous ceramic filter to be employed in the porous ceramic joined filter body (hereafter referred to as joined filter body).

As illustrated, the ceramic filter 140 is formed into a cylindrical body having an outer peripheral surface 142a and an inner peripheral surface 142b slanting to reduce (or increase) diameters toward the flowing down direction. Namely, the ceramic filter 140 is formed into a conico-cylindrical body 142 having contour line extending in oblique relative to the flowing down direction. In a wall portion 142c of the conico-cylindrical body 142, a plurality of through holes 143 extending in oblique to the flow axis and in parallel to the contour line of the conico-cylindrical body 142, are formed. In the shown embodiment, ten through holes 143 are formed in the conico-cylindrical body 142. In the shown embodiment, each of the through holes 143 is formed to have an elongated circular configuration at the larger diameter top end and to have circular or elongated circular configuration with reduced longer axis length at the smaller diameter lower end. It should be appreciated that the number and configuration of the through holes 143 are not limited to those illustrated. In the example shown in FIG. 11(b), the central through opening 144 defined by the inner peripheral surface 142b, whose diameter decreases toward the lower end, has a circular cross section reducing the diameter toward the lower end. The ceramic filter 140 illustrated in FIGS. 11(a), 11(b) and 11(c) is differentiated from the ceramic filter 20 illustrated in FIGS. 3(a) and 3(b) in that a plurality of the through holes 143 serving as the flow paths extend in oblique and reduce the cross sectional area toward the lower end, the diameter of the central through opening 144 decreases toward the lower end and the diameter of the outer peripheral surface 142a decreases toward the lower end. However, it is similar to the former embodiment in that the central through opening (144 and 44) is provided for flowing the non-purified pool water or the purified pool water, a plurality of through holes (143 and 43) are provided through the wall portion (142c and 42) for flowing at least first stage or primarily purified pool water. The function, manner of use and modifications are similar to those of the ceramic filter 20. Therefore, further discussion for the function, manner of use and the modifications are neglected for simplification of the disclosure.

As set forth above, the ceramic filter 140 illustrated in FIG. 11, requires a larger diameter connecting member 146 for mutually connecting the larger diameter ends and a smaller diameter connecting member 152 for mutually connecting the smaller diameter ends, as connecting members (connecting rings) for connecting two filters 140.

Figure 12A:
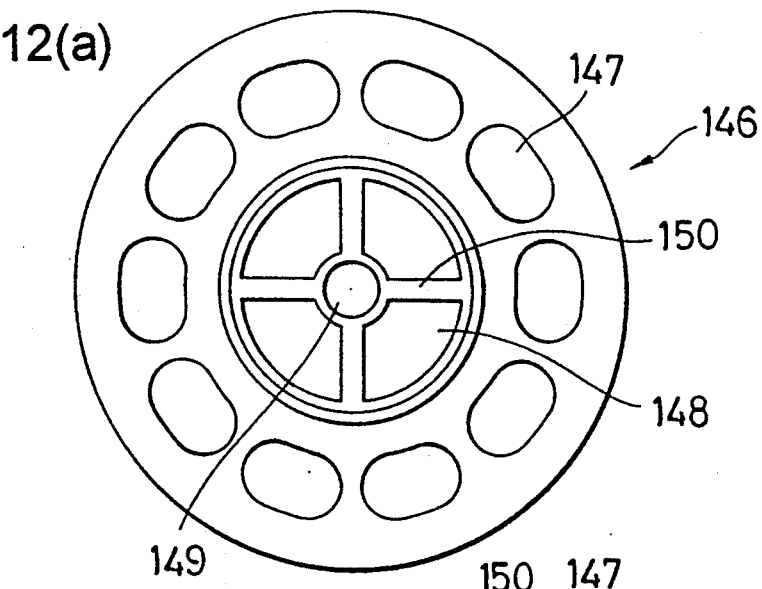
FIGS. 12(a) and 12(b) are a top plan view and a partial section showing one embodiment of a connecting member for connecting the ceramic filters shown in FIG. 11.
Figure 12B:
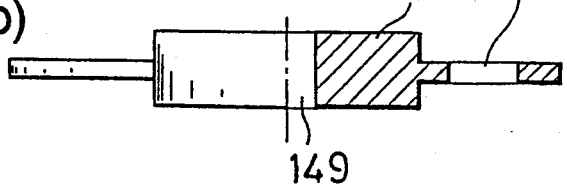
Figure 13A:
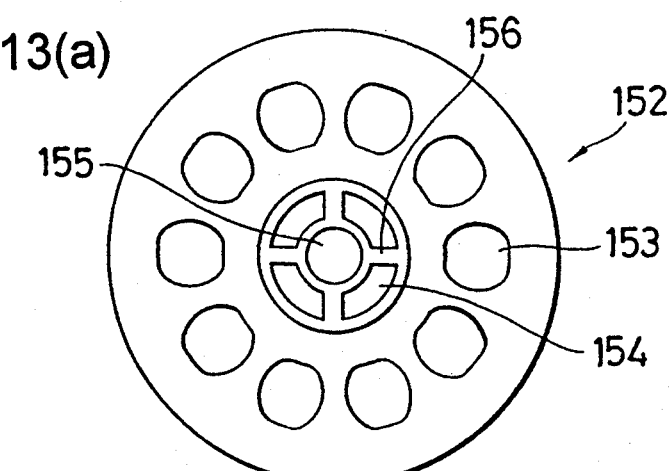
FIGS. 13(a) and 13(b) are a top plan view and a partial section of another embodiment of a connecting member for connecting the ceramic filters shown in FIG. 11.
Figure 13B:
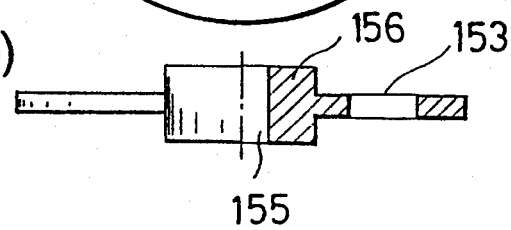

The larger diameter connecting member 146 is adapted for connecting between the ceramic filter 140 oriented in the position shown in FIG. 11(b) and another ceramic filter 140 which is in reversed orientation. As shown in FIGS. 12(a) and 12(b), the larger diameter connecting member 146 is a disc shaped member having a substantially equal diameter to the larger diameter end of the filter 140. The larger diameter connecting member 146 has a thinner circumferential portion defining a plurality of openings 147 having essentially the same configuration to corresponding larger diameter side opening end of the through holes 143. The larger diameter connecting member 146 also has a central thicker portion defining an opening 148 which substantially corresponds to the central through opening 144 of the filter 140 and separated into four sections. A center hole 149 is also defined at the center of the central thicker portion for receiving a bolt or stud 54 forming a clamping means for the filter assembly. The central thicker portion defining the center hole 149 and dividing the opening 148 into four sections, can be engaged into the central through opening 144 of the filter 140. Four radially extending ribs 150 enables positioning of the connecting member 146 relative to the bolt 54. As shown in FIG. 13(a) and 13(b), the smaller diameter connecting member 152 has a thin circumferential portion defining a plurality of openings 153 corresponding to a plurality of the through holes 143 of the filter 140, an opening 154 divided into four sections, a hole 155 for receiving the stud 54 and a thick ribs 156, similarly to the larger diameter connecting member 146.

Figure 14:
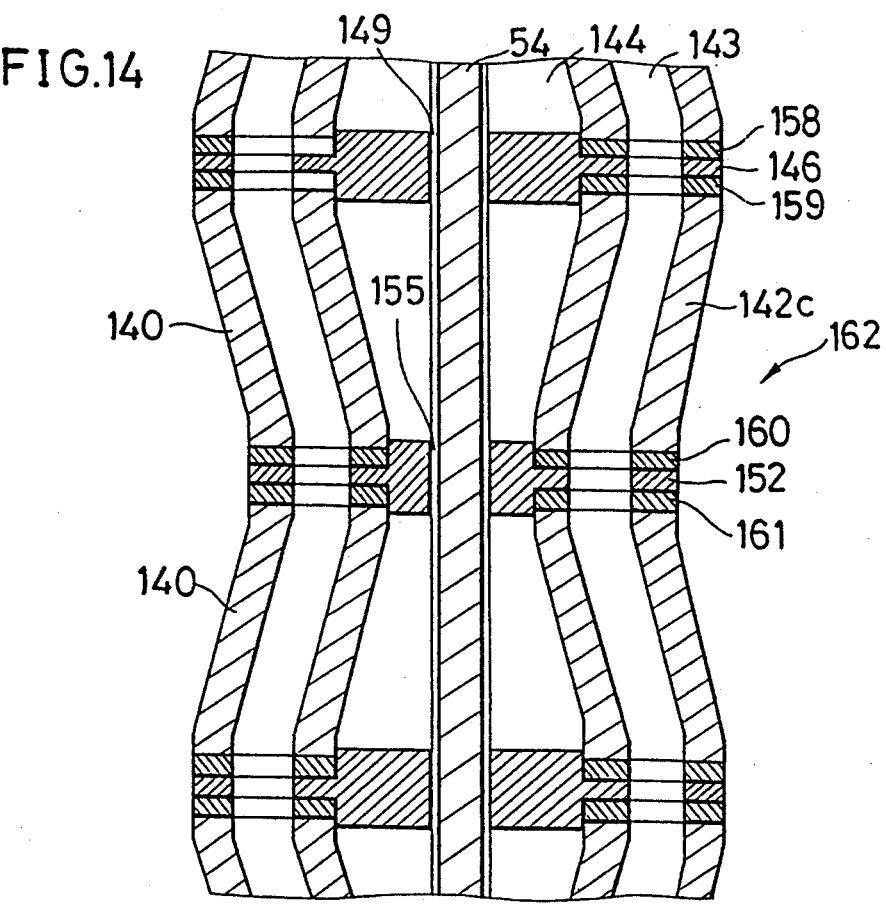
FIG. 14 is a longitudinal section of another embodiment of a laminated ceramic filter of the invention.

By mutually connecting the larger diameter ends via a packing 158, the connecting member 146 and the packing 159, and mutually connecting the smaller diameter ends via a packing 160, the connecting member 152 and a packing 161, a plurality of the filters 140 are connected to form a joined filter body 162 as illustrated in FIG. 14. Such joined filter body 162 has paths bent toward the center, filtration efficiency can be improved.

Here, the joined filter body 162 illustrated in FIG. 14 forms the bent through holes 143 by joining the ceramic filters 140 defining the obliquely extending through holes 143 with alternately employing the connecting members 146 and 152. However, the present invention should not be limited to the shown construction. As shown in FIG. 45, it is possible to use a ceramic filter 170 per se having a mortar like configuration with bent outer peripheral surface 172a and inner peripheral surface 172b and defining a plurality of bent through holes 173 through the wall portion 172c. In this case, the bent central through opening 174 is defined by the inner peripheral surface 172b. By connecting two such ceramic filters 170 via the packing 158, the connecting member 146 and the packing 159, the joined filter body 176 having the bent flow paths can be obtained.

Figure 6D:
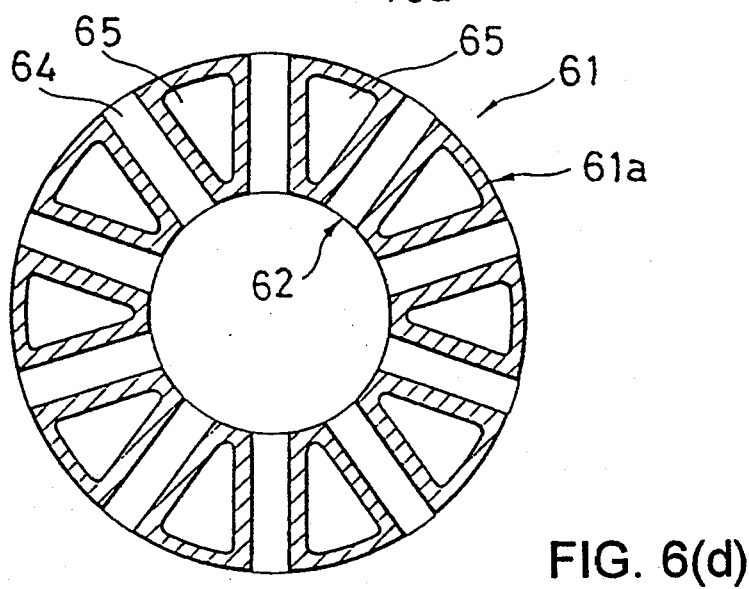
Figure 15:
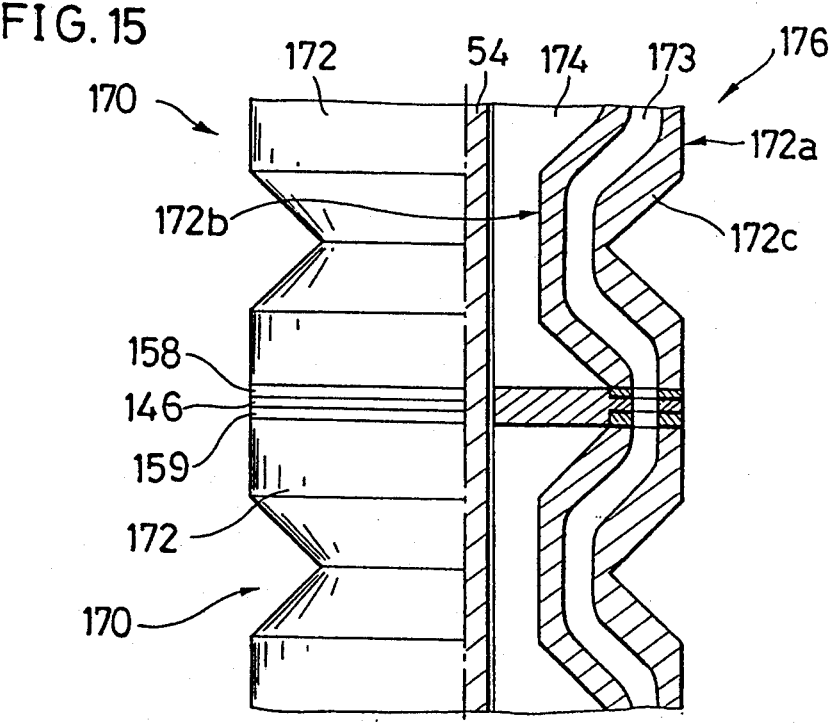
FIG. 15 is a longitudinal section of a further embodiment of a laminated ceramic filter of the invention.

The joined filter bodies 121, 162 and 176 shown in FIGS. 10, 14 and 15 may be assembled into the filter assembly by disposing between the cover 51 illustrated in FIGS. 5(a) and 5(b) and the jacket 52 illustrated in FIGS. 6(c) and 6(d), or, in the alternative, the cover 77 illustrated in FIGS. 7(a) and 7(b) and the jacket 80 illustrated in FIG. 8, and fixing by means of the stud 54 and the nut 55.

Although the pool water purification plant has been exemplary illustrated with taking the pool water as the liquid to be purified, as typical example, for the liquid purifying porous ceramic filter according to the present invention, the joined body thereof, the liquid purifying porous ceramic filter assembly, and the liquid purification plant, the present invention should not be limited to the application as shown and illustrated above. For instance, the liquid to be purified can be any liquid required to be freed of impurities, such as the river water, the sea water for obtaining the drinking water, the city water or well water which require purification, waste water, particularly an industrial waste water, the living originated (family) waste water, brewages, e.g. beers, wines, sakes, soy sauces, sauces, drinks, fruit juices, cooling oils and so forth. Also, the various filtration unit other than that employing the porous ceramic filter, the disinfection unit, the absorption filtration unit can be selected appropriately depending upon the kind of the liquid, for which the present invention is applied.

The liquid purifying porous filter according to the first aspect of the present invention defines a plurality of through holes through the wall section. However, the present invention is not limited to the shown construction. For instance, it can include filters, in which a plurality of through holes extend through the interior space, as illustrated in FIGS. 16 and 17.

Figure 16:
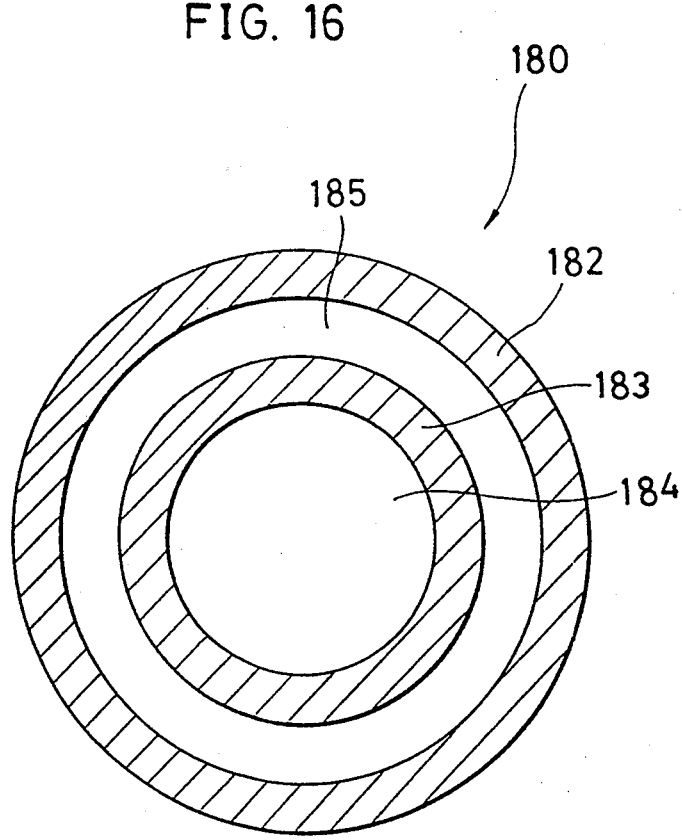
FIG. 16 is a cross section of another embodiment of a liquid purifying porous filter of the invention.
Figure 17:
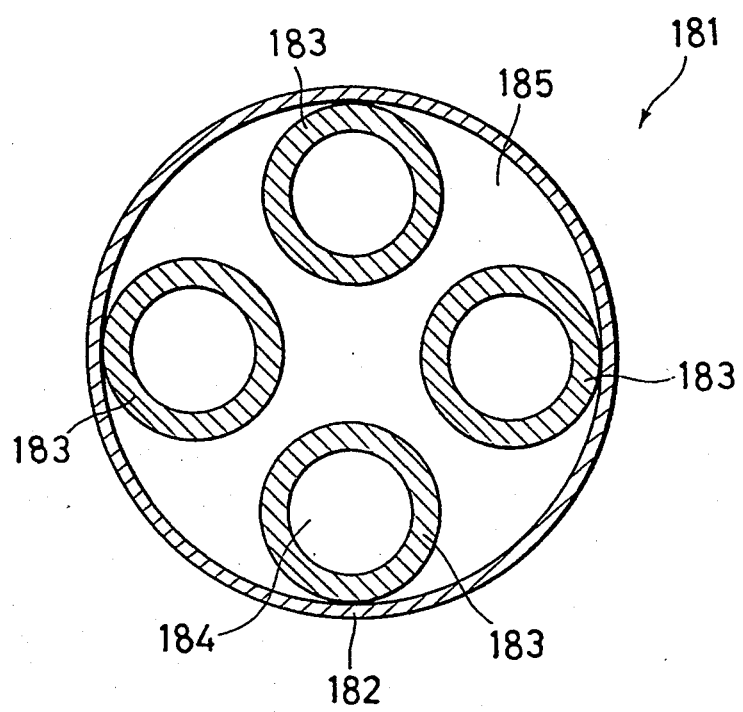
FIG. 17 is a cross section of a further embodiment of a liquid purifying porous filter of the invention.

The porous filter 180 illustrated in FIG. 16 is a double cylinder filter which is form by coaxially arranging a smaller diameter filter 183 within a larger diameter filter 182. In this case, a central through opening 184 is defined by the inner periphery of the smaller diameter filter 183, and an annular through hole 185 defined between the smaller and larger diameter filters 183 and 182. On the other hand, the porous filter 181 illustrated in FIG. 17 has the construction, in which a plurality of, four in the shown case, smaller diameter filters 183 are disposed within the larger diameter filter 182 to define fourth central through openings 184 defined by the inner peripheries of respective of the smaller diameter filters 183 and a through hole 185 defined by the outer peripheries of the smaller diameter filters 183 and the inner periphery of the larger diameter filter 182. These filters 180 and 181 can be used in the identical manner to that of the filter 20 shown in FIG. 3.

Discussion will be given for the manner of back washing for the liquid purifying porous filter according to the first aspect of the present invention with reference to FIG. 18, in which is diagrammatically illustrated a fine filtration unit 186 employing the porous filter 180 of FIG. 16 for simplification of the discussion.

The fine filtration unit 186 is considered to be disposed in a housing 187 with closing the upper and lower ends thereof. A pipe 189 communicating with an external flow path 188 defined between the inner periphery of the housing 187 and the outer periphery of the filter 180 (outer periphery of the larger diameter filter 182), a pipe 190 communicating with the through hole 185, a pipe 191 communicating with the central through opening 184, a pipe 192 for establishing communication between the pipes 189 and 191 are provided. Valves 193, 194 and 195 are provided in the pipes 189, 190 and 191, respectively.

Here, in the normal operation for purification, the valves 193, 194 and 195 are held open to introduce a non-purified liquid, such as the pool water from the pool. The liquid flit rated by the filters 182 and 183 enters into the though hole 185. The purified liquid, such as the pool water, is recirculated to the pool, for example, via the pipe 190.

Conversely, during back washing operation, the purified liquid with the high pressure air is introduced into the through hole 185 at high velocity through the pipe 190 so as to sweep the impurities, adhering, diatom earth, fibrous substances and so forth off the outer periphery of the larger diameter filter 182 and the inner periphery of the smaller diameter filter 183. Then, the liquid is drained through the pipes 189 and 191 together with the removed filtration slurry and the filter aid. After sufficient back washing, the flow paths are again reversed to introduce the liquid to be purified with the filter aid through the pipes 189 and 191 to coat the outer periphery of the larger diameter filter 182 and the inner periphery of the smaller diameter filter 183. To optimally establish the coating, the liquid flowing into the through hole 185 and passing through the filters 182 and 183 is recirculated to the pipes 189 and 191 via the pipe 190.

Figure 18:
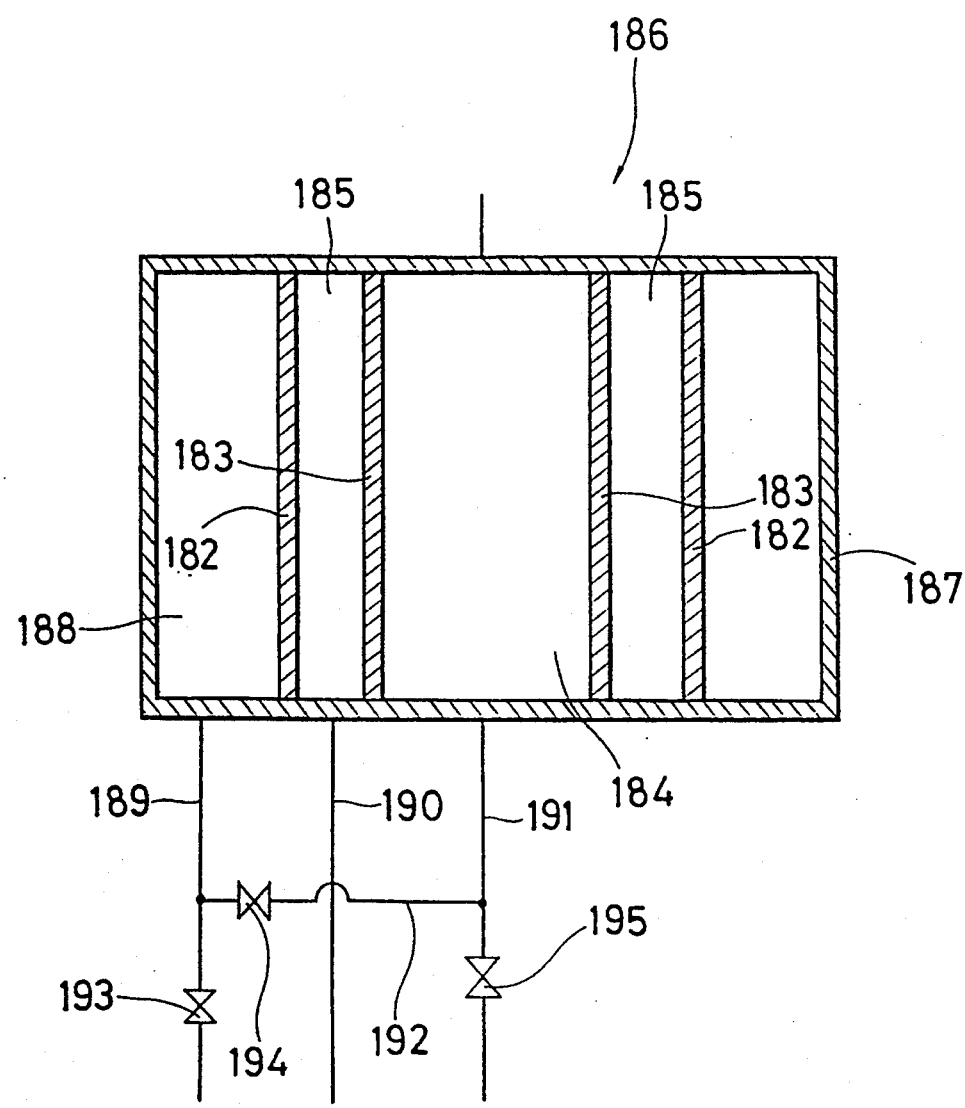
FIG. 18 is a diagrammatic illustration for illustrating manner of purification and back washing in the liquid purification plant of the invention.

The filtration plant 186 illustration in FIG. 18, can perform back washing without stopping the operation. In this case, it becomes necessary to provide a sub-tank which may accumulate a given amount of the purified liquid. At first when the outer periphery of the larger diameter filter 182 is back washed by closing the valve 194, the flow direction only between the pipes 189 and 190 is reversed by lowering pressure in the flow path 188 to perform back washing through a flow path established through the sub-tank—pipe 190—the through hole 185, the filter 182—flow path 188 and the pipe 189. Here, it is necessary to perform back washing with maintaining pressure balance between the central through opening 184 and the through hole 185. Otherwise, the coating on the inner periphery of the smaller diameter filter 183 may also be peeled off. After sufficient back washing, the flow path is reversed to form the recirculation path for establishing the coating of the filter aid for obtaining optimal coating as set forth above. During this operation, it is necessary to supply the facility, such as the pool, to continue supply of the purified liquid from the sub-tank. On the other hand, the back washing and re-coating of the inner periphery of the smaller diameter filter 183 is performed by reversing and again reversing the flow direction through the pipes 190 and 191, substantially in the same manner.

In the alternative, back washing can also be performed without stopping operation for filtration in the following method. The above-mentioned sub-tank is also required in the alternative method. Similarly to the foregoing embodiment, it is of course necessary to use the cover and jacket which can flow the non-purified liquid independently to the central through opening 184 and the outer flow path 188.

When back washing of the inner peripheral surface of the smaller diameter filter 183 is performed. The valve 194 is initially closed to terminate introduction of the pressurized non-purified liquid into the central through opening 184. Then, the non-purified liquid in the central through opening 184 is drained through the pipe 191 to lower the pressure in the central through opening to be lower than that in the through hole 185. By this, the pressurized non-purified liquid flowing into the outer flow path 188 through the pipe 189 is filtrated by the larger diameter filter 182 and enters into the through hole 185. Then, the purified liquid flowing through the through hole 185 passes through the smaller diameter filter 183 to flow into the central through opening 184 at the reduced pressure. At this time, the filter aid coated on the inner periphery of the smaller diameter filter 183 and filtration slurry is removed from the inner periphery of the smaller diameter filter 183 with the flow of the liquid. Thus, back washing of the smaller diameter can be performed. At this time, the purified liquid flowing through the through hole 185 is reduced in an amount corresponding to the amount flowing into the central through opening 184. The reduced amount of the liquid is supplied from the sub-tank (surge tank) through a not shown pipe into the through hole 185.

As a result, through the pipe, similarly to that in the filtration operation, the purified liquid in the equal amount to that in the flirtation operation can be recirculated into a liquid storage tank, such as a pool. Namely, the back washing of the smaller diameter filter can be performed with performing filtration by the larger diameter filter.

In order to coat the filter aid on the inner periphery of the smaller diameter filter 183, it becomes necessary to circulate a liquid suspending the filter aid through the pipe 191, the central through opening 184, the through hole 185 and the pipe 190 so that the liquid is recirculated into the pipe 191 from the pipe 190. Therefore, during a short period required to perform coating of the inner peripheral surface of the smaller diameter filter 183, the purified liquid has to be supplied to the liquid storage tank, such as the pool, from the sub-tank.

As can be appreciated, back washing of the filter aid and filtration slurry on the outer peripheral surface of the larger diameter filter 182 can be performed in the similar manner by closing the valve 194 to lower the pressure in the outer flow path 188 to be lower than that in the through hole 185. Also, costing of the filter aid after back washing can be performed substantially the same manner by circulating in a recirculation path of the pipe 189, the outer flow path 188, the through hole 185, the pipe 190, in which the liquid is recirculated from the pipe 190 to the pipe 189. On the other hand, as the porous filter according to the present invention, a porous filter 196 as illustrated in FIG. 19 can be employed.

The shown porous filter 196 has a partition 198 for dividing the through hole 185 of the porous filter 180 of FIG. 16 to form two through holes 18a and 185b. When a non-permeable coating is provided on the peripheral surfaces 198a of the partition 198, or, in the alternative, the non-permeable partition 198 is formed of a non-permeable material, and when such filter 196 is employed in the filtration plant, it becomes possible to use one of the through holes 185a and 185b for purifying operation and the other for back washing. Therefore, even through the purification amount is lowered, back washing can be performed during purifying operation without requiring the above-mentioned sub-tank. Of course, both of the through holes 185a and 185b are used for purification in the normal operation. Also, it is, of course possible to use both for back washing. Since concrete flow path construction can be considered to be similar to that in FIG. 18, therefore, discussion and illustration therefore is neglected for maintaining the disclosure simple enough for better understanding of the invention.

Figure 19:
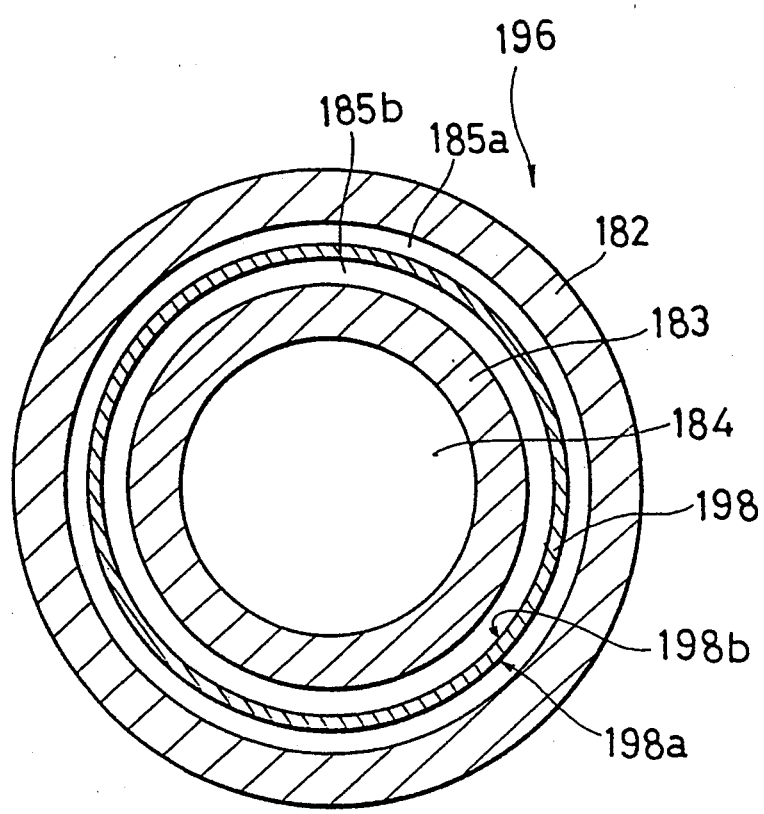
FIG. 19 is a cross section of a still further embodiment of a liquid purifying porous filter of the invention.
Figure 21:
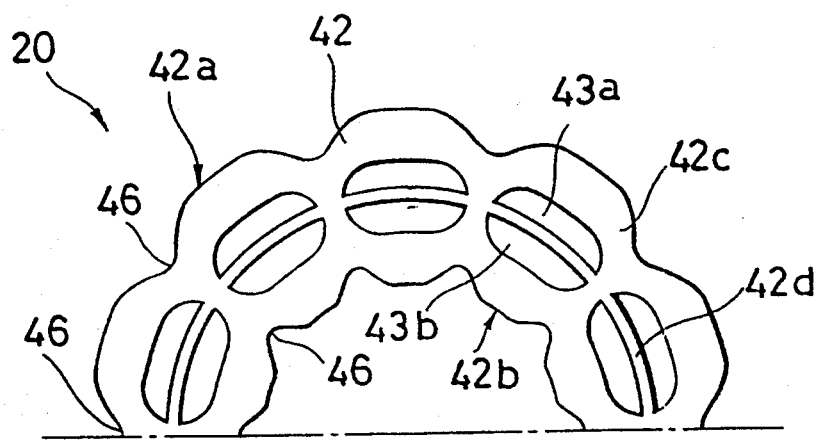
FIG. 21 is a cross section of the upper half of a still further embodiment of the liquid purifying porous filter of the invention.
Figure 20A:
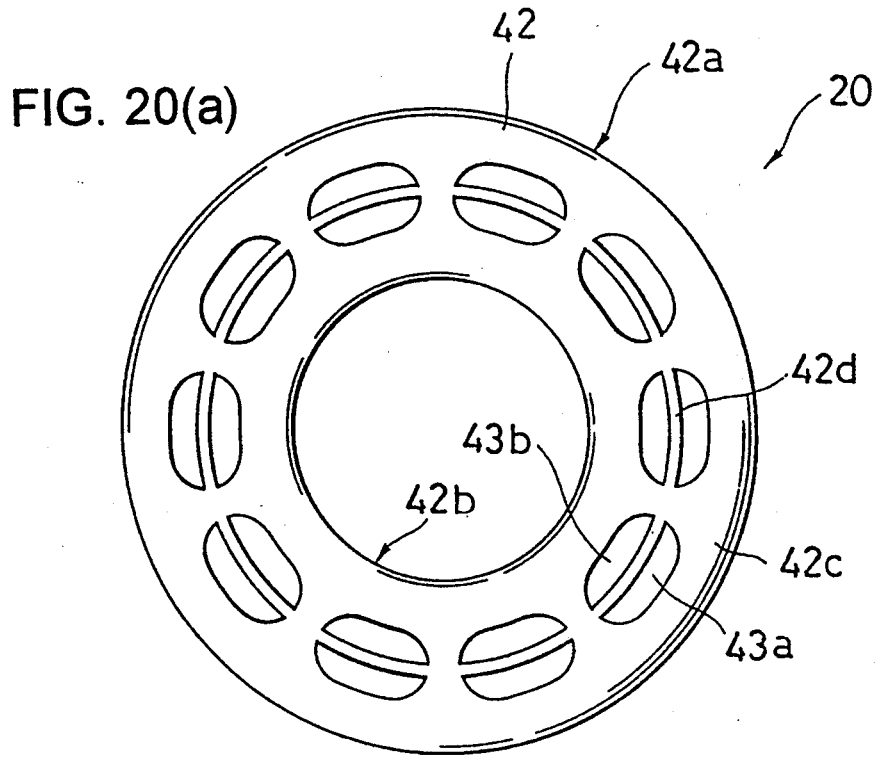
FIGS. 20(a) and 20(b) are a top plan view and a section of the upper portion of a yet further embodiment of a liquid purifying porous filter of the invention.

The porous filter having the through holes divided into two, is not limited to that illustrated in FIG. 19. For instance, as shown in FIGS. 20(a), 2O(b) and 21, it may be possible that a partition 42d is formed in each of a plurality of the through holes 43 of the porous filter 20 of FIG. 3 to define radially aligned two through holes 43a and 43b. In addition, it is possible to provide the partitions for a plurality of through holes in any one of the embodiments of the invention.

Figure 20B:
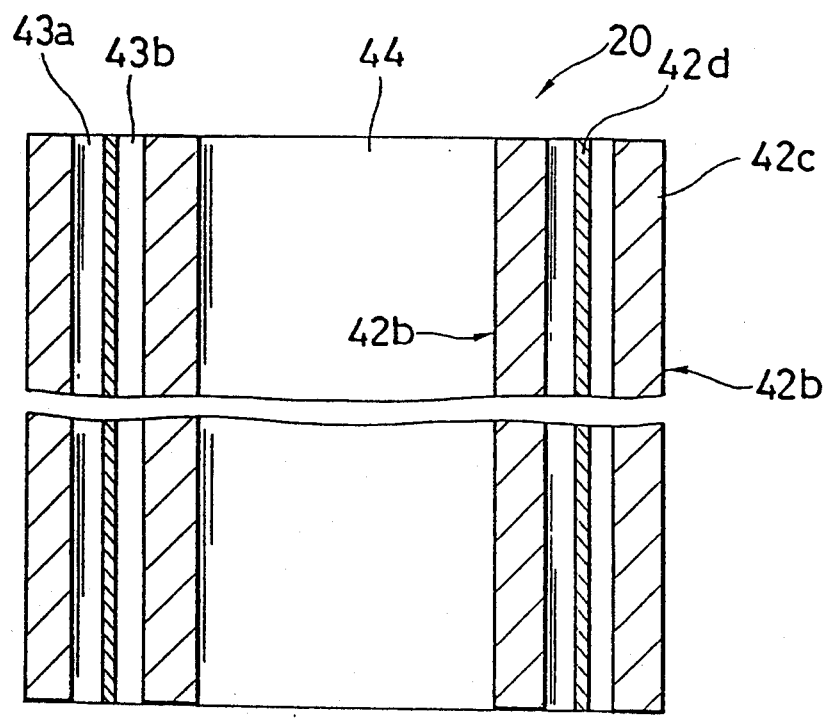
Figure 22A:
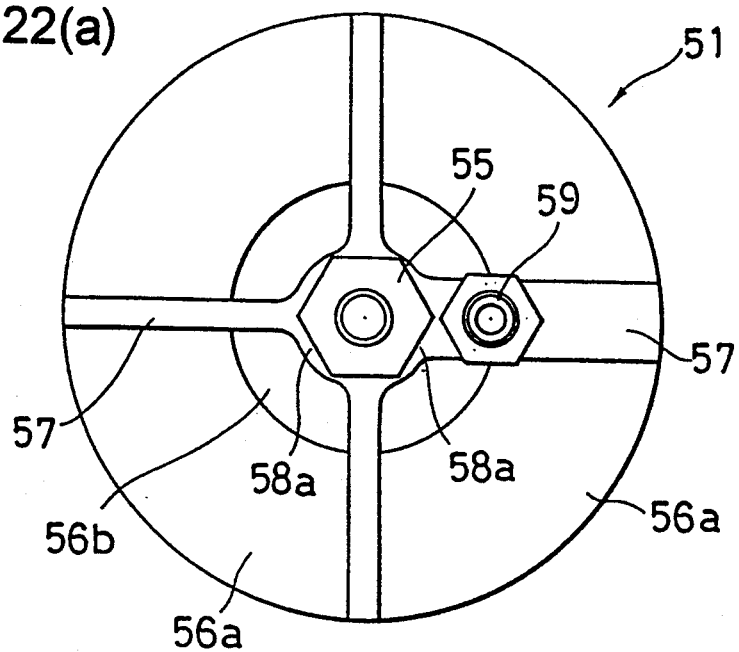
FIGS. 22(a) and 22(b) are a top plan view and a section of the upper portion of a still further embodiment of a liquid purifying porous filter of the invention.
Figure 22B:
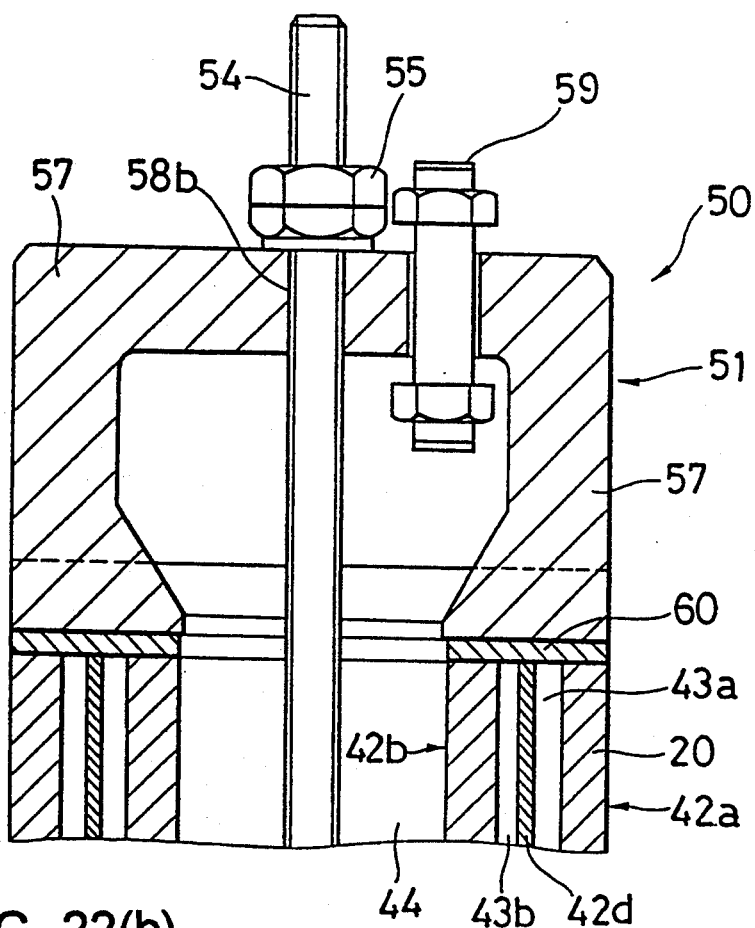
Figure 23C:
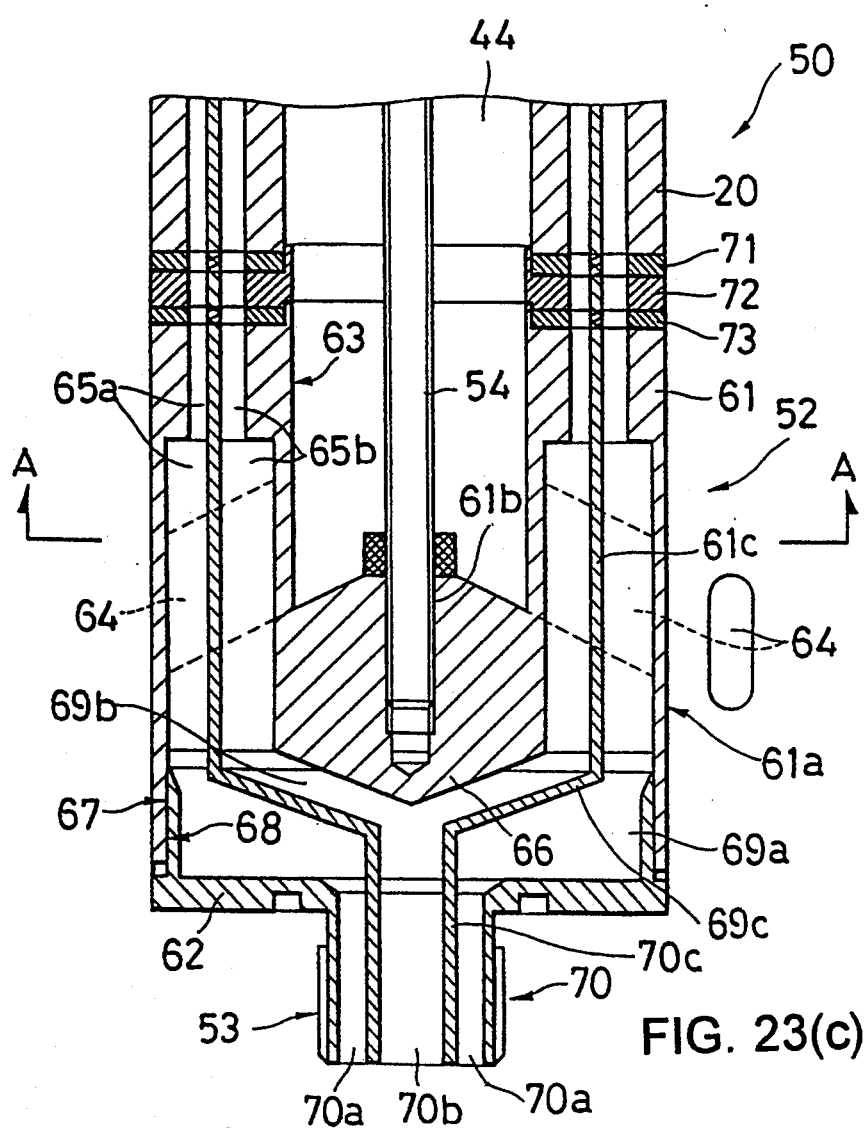
FIGS. 23(a) and 23(d) are section of the lower portion and a section taken along line A—A.
Figure 23D:
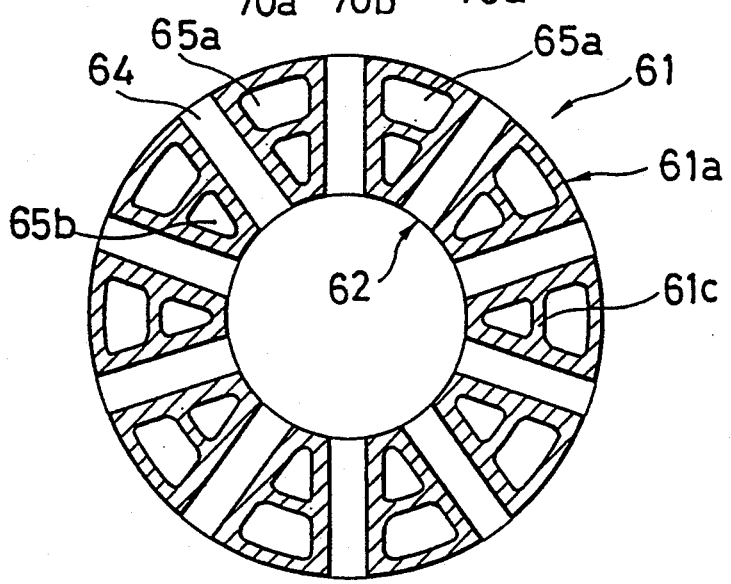
Figure 24:
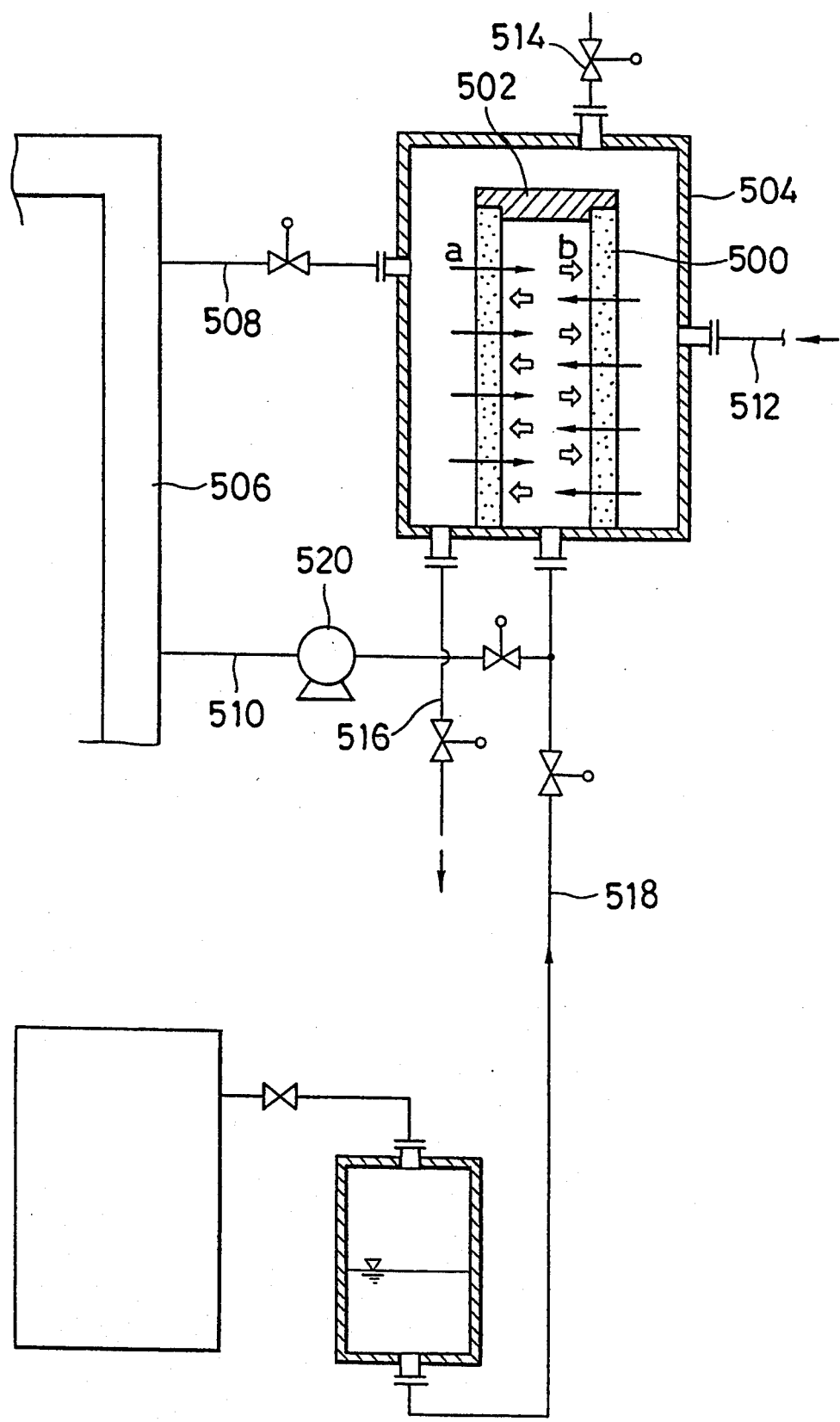
FIG. 24 is a general illustration of the conventional liquid purification plant.

The filter assembly 50 employing the porous filter 20 as illustrated in FIG. 20, can be constructed as illustrated in FIGS. 22(a), 22(b), 23(c) and 23(d). Namely, as the cover 51 to be employed in the filter assembly 50, a cover similar to that illustrated in FIGS. 5(a) and 5(b) can be employed. However, a jacket 52 is provided with partitions 61c for dividing the through holes 65 of FIGS. 6(c) and 6(d) into outer through holes 65a and inner through holes 65b. The jacket 52 is also provided with an essentially conico-cylindrical partition 69c for dividing the space 69 into an outer space 69a and an inner space 69b. Furthermore, the jacket 52 has a cylindrical partition 70c which divides the outlet opening 70 into an outer outlet opening 70a and an inner outlet opening 70b. Here, the partitions 61c, 69c and 70c are continuous. The through holes 65a, the space 69a and the outlet opening 70a communicate with each other to establish outer flow paths, and the through holes 65b, the space 69b and the outlet opening 70b are communicated with each other to establish inner flow paths.

Although the porous ceramic filter according to the first aspect of the present invention has been discussed as a typical example of the liquid purifying porous filter, the present invention should not be limited to the shown filter but can employ any filters which has three-dimensionally arranged fine voids for filtering the fine particles, such as bacteria and oils excreted from the human body. Therefore, the material for the filter is not limited to the ceramic. Also, the size of the voids in the filter may be appropriately selected depending upon the particle size of the impurities to be removed from the liquid, For example, porous filters formed of a compressed stainless pile or a compressed metal pile obtained through compression of three-dimensional fibrous articles, a compressed carbon fiber, a sintered metal, an aggregate of a resin beads and other various material, may be employed.

As set forth above, the liquid purifying porous filter according to the first aspect of the present invention, particularly the porous ceramic filter, can significantly increase the contact area in comparison with those in the prior art. Therefore, purification processing capacity and purification degree for the pool water, drinking water, liquors and so forth can be remarkably improved. Also, in case that a plurality of through openings are arranged in radial and circumferential alignment, it becomes possible to perform back washing during purifying operation.

On the other hand, with the joined porous filter according to the second aspect of the invention, one can achieve the additional advantage of mass production capability given shorter length and ease of handling since it can be joined depending upon the plant where it will be used. Furthermore, since bent flow paths are formed, the purification processing performance can be enhanced.

Also, with the liquid purifying filter assembly according to the third and the fourth aspects of the invention, the filter becomes compact and easy to stay. Also, with minor improvement of the conventional construction of the plant, the purification processing amount and the purification degree of the liquid, such as the pool water, the drinking water, the liquors and so forth can be remarkably increased. Furthermore, it permits to make the plant more compact while processing an equal amount and purifying to the same degree as those of the prior art.

Also, with the liquid purification plant according to the fifth aspect of the invention, relative to the purification amount and the purification degree of the liquid, such as the pool water, the drinking water, the liquors and so forth, not only the filtration unit but also the overall construction of the purification plant can be constructed smaller and compact. In addition, it is possible to perform back washing during purification operation, it may not cause substantial drop of the processing performance due to blocking or the like, even when the plant is operated continuously without stopping.

With the liquid purification plant according to the sixth aspect of the present invention, since the purification facility can be constructed as an integrated unit, it becomes possible to install the unit at the side after production thereof. This makes handling and installation easier. Furthermore, the processing amount and the purification degree can be significantly improved.

Furthermore, in case of the liquid purification plant, such as the pool water purification plant, including the ultramicro filtration means, it can hold effect for capability of filtering of virus and proteins as well as the organic substance, such as oil and so forth, and bacteria. Therefore, the pool water can be constantly maintained clean. Also, by performing back washing of the ultramicro filtration unit, the expensive ultramicro filtration membrane can be used for long period without fatigue so that it may be constantly used with a satisfactorily high performance and thus constantly permits a high degree of purification of the liquid, such as the pool water.

What is claimed is:

1. A porous filter for purifying a liquid comprising:
a hollow body having an outer peripheral surface and an inner peripheral surface, said inner peripheral surface defining an axially extending central through opening, said hollow body having defined therethrough a plurality of through holes extending in an axial direction between axially opposite ends of said hollow body, said through holes being located in a wall portion of said hollow body defined between said outer peripheral surface and said inner peripheral surface and said through holes being isolated from each other, and each of said through holes having a diameter substantially less than the diameter of the central through opening, thereby to provide two filtration stages through filter regions disposed radially inwardly and radially outwardly of said through holes.

2. A liquid purifying porous filter as set forth in claim 1, wherein said outer peripheral surface of said hollow body has an uneven configuration.

3. A liquid purifying porous filter as set forth in claim 1, wherein said inner peripheral surface of said hollow body has an uneven configuration.

4. A liquid purifying porous filter as set forth in claim 1, wherein said plurality of through holes defined in said hollow body extend in a direction at an angle with respect to the axial direction.

5. A liquid purifying porous filter as set forth in claim 4, wherein said plurality of through holes defined in said hollow body are meandering.

6. A liquid purifying porous filter as set forth in claim 4, wherein said outer and inner peripheral surfaces of said hollow body extend along said plurality of through holes to define a frustoconical or a mortar like configuration.

7. A liquid purifying porous filter as set forth in claim 1, wherein said plurality of through holes are aligned in at least two tangential rows.

8. A liquid purifying porous filter as set forth in claim 1, wherein said liquid purifying porous filter is a porous ceramic filter.

9. A liquid purifying plant comprising:
at least one of an absorptive purification means, a disinfection means and an ultramicro filtration means within a hollow body of a liquid purifying porous filter as defined in claim 1.

10. A joined liquid purifying porous filter comprising:
a plurality of porous filters for purifying a liquid, each filter comprising a hollow body having an outer peripheral surface and an inner peripheral surface, said inner peripheral surface defining an axially extending central through opening, said hollow body having defined therethrough a plurality of through holes extending in an axial direction between axially opposite ends of said hollow body, said through holes being located in a wall portion of said hollow body defined between said outer peripheral surface and said inner peripheral surface and said through holes being isolated from each other; and
at least one joining member interposed between adjacent porous filters to define a fluid flow path between said central through openings of the axially adjacent porous filters and a plurality of fluid flow paths between said plurality of through holes of the axially adjacent porous filters.

11. A joined liquid purifying porous filter as set forth in claim 10, wherein said joining member has central openings at both axial ends and mating with said central through openings of said hollow body of said porous filter and closed at the other end, a communication hole for communicating said central opening to the outer peripheral surface of said hollow body, and a plurality of circumferentially arranged communication paths respectively located corresponding to a plurality of said through holes of said hollow body for communication therewith.

12. A joined liquid purifying porous filter as set forth in claim 10, wherein said porous filters are truncated conical bodies, which are connected at one of the larger diameter ends and the smaller diameter ends by means of said joining members so as to define axially meandering through holes.

13. A liquid purifying porous filter assembly for purifying a non-purified liquid into a purified liquid comprising:

a porous filter for purifying a liquid comprising a hollow body having an outer peripheral surface and an inner peripheral surface, said inner peripheral surface defining an axially extending central through opening, said hollow body having defined therethrough a plurality of through holes extending in an axial direction between axially opposite ends of said hollow body, said through holes being located in a wall portion of said hollow body defined between said outer peripheral surface and said inner peripheral surface and said plurality of through holes being isolated from each other;

a jacket supporting one end of said filter, said jacket having an outer periphery; a central opening defined in one end of a joining member in alignment with said central through opening of said porous filter for receiving the non-purified liquid, said central opening being closed at the other end; a plurality of purified liquid flow paths defined around said central opening in alignment with said plurality of through holes of said porous filter to receive the purified liquid; and a central discharge opening defined in the other end of said jacket for receiving the purified liquid from said plurality of purified liquid flow paths and discharging the purified liquid from the assembly; at least one communication hole extending between said central opening and said outer periphery of said jacket and formed in a wall portion of said jacket between adjacent purified liquid flow paths;

a cover supporting the other end of said filter, said cover having at least one opening defined therein aligned with said central through opening of said hollow body of said porous filter for introducing the non-purified liquid; a nozzle provided for washing said central through opening; and a peripheral edge portion blocking said plurality of through holes of said hollow body of the porous filter; and means for holding said filter between said jacket and said cover.

14. A liquid purifying filter assembly as set forth in claim 13, wherein said holding means comprises a female thread portion provided at a blocking portion of said central hole of said jacket, a stud having male thread portions at both ends, a supporting portion provided at the center portion of said cover and defining an opening, through which said stud extends, and a nut threadingly engaged to said stud.

15. A liquid purifying filter assembly as set forth in claim 14, wherein said supporting portion is formed with arm members radially extending from a circumferential portion of said cover.

16. A liquid purifying plant comprising:
a filtration means having at least one liquid purifying filter assembly as defined in claim 13 within a filtration tank, a back washing means for said filtration means, an absorptive purification means and a disinfection means.

17. A liquid purifying plant as set forth in claim 16, further comprising an ultramicro filtration means.

18. A liquid purifying assembly comprising:

a liquid purifying porous filter comprising a hollow body having an outer peripheral surface and an inner peripheral surface, said inner peripheral surface defining an axially extending central through opening, said hollow body having defined therethrough a plurality of through holes extending in an axial direction between axially opposite ends of said hollow body, said through holes being located in a wall portion of said hollow body defined between said outer peripheral surface and said inner peripheral surface and said through holes being isolated from each other;

a jacket supporting one end face of said filter, said jacket defining discharge paths corresponding to a plurality of said through holes of said filter for discharging a first stage purified liquid and a central discharge path for flowing a second stage purified liquid;

a cover supporting the other face of said filter in blocking fashion, said cover having nozzles positioned to correspond to a plurality of said through holes of said filter for washing respective through holes; and means for holding said filter between said jacket and said cover.

19. A liquid purifying filter assembly as set forth in claim 18, wherein said holding means comprises a female thread portion provided at a blocking portion of said central hole of said jacket, a stud having male thread portions at both ends, a supporting portion provided at the center portion of said cover and defining an opening, through which said stud extends, and a nut threadingly engaged to said stud.

20. A liquid purifying plant comprising:
a filtration means having at least one liquid purifying filter assembly as defined in claim 18, within a filtration tank, a back washing means for said filtration means, an absorptive purification means and a disinfection means.

* * * * *